(12) United States Patent
Steinbichler et al.

(10) Patent No.: US 9,671,313 B2
(45) Date of Patent: Jun. 6, 2017

(54) TIRE TESTING APPARATUS AND METHOD FOR TESTING A TIRE

(71) Applicant: Steinbichler Optotechnik GmbH, Neubeuern (DE)

(72) Inventors: Marcus Steinbichler, Neubeuern (DE); Rainer Huber, Piding (DE)

(73) Assignee: STEINBICHLER OPTOTECHNIK GMBH, Neubeuern (DE)

( * ) Notice: Subject to any disclaimer, the term of this patent is extended or adjusted under 35 U.S.C. 154(b) by 259 days.

(21) Appl. No.: 13/861,064

(22) Filed: Apr. 11, 2013

(65) Prior Publication Data
US 2013/0340515 A1    Dec. 26, 2013

(30) Foreign Application Priority Data

Apr. 12, 2012 (DE) .................. 10 2012 007 270

(51) Int. Cl.
*G01M 17/02* (2006.01)
*B60C 25/00* (2006.01)

(52) U.S. Cl.
CPC ......... *G01M 17/027* (2013.01); *B60C 25/002* (2013.04); *B60C 25/005* (2013.04); *B60C 25/007* (2013.04)

(58) Field of Classification Search
CPC ... B60C 25/002; B60C 25/005; B60C 25/007; G01M 17/027
See application file for complete search history.

(56) References Cited

U.S. PATENT DOCUMENTS

| | | | | |
|---|---|---|---|---|
| 2,812,583 A | * | 11/1957 | Herzegh | G01B 5/06 33/203 |
| 3,492,863 A | * | 2/1970 | Vance | G01M 13/023 374/57 |
| 4,936,138 A | * | 6/1990 | Cushman | G01M 17/025 73/146 |
| 5,088,321 A | * | 2/1992 | Kajikawa | G01M 17/027 356/71 |

* cited by examiner

*Primary Examiner* — Robert Huber
*Assistant Examiner* — Herbert K Roberts
(74) *Attorney, Agent, or Firm* — Dilworth & Barrese, LLP.

(57) ABSTRACT

A tire testing apparatus for testing a tire comprises a loading means for the tire (17), a measuring head (20, 22, 24) which is movable relative to the tire (17), and lower bearing elements (7) on which the tire (17) can be positioned in vertical position. To improve such tire testing apparatus, the tire testing apparatus comprises upper bearing elements (8) which are movable relative to the lower bearing elements (7) and which together with the lower bearing elements (7) form a holder for the tire (17). (FIG. 8*c*)

19 Claims, 22 Drawing Sheets

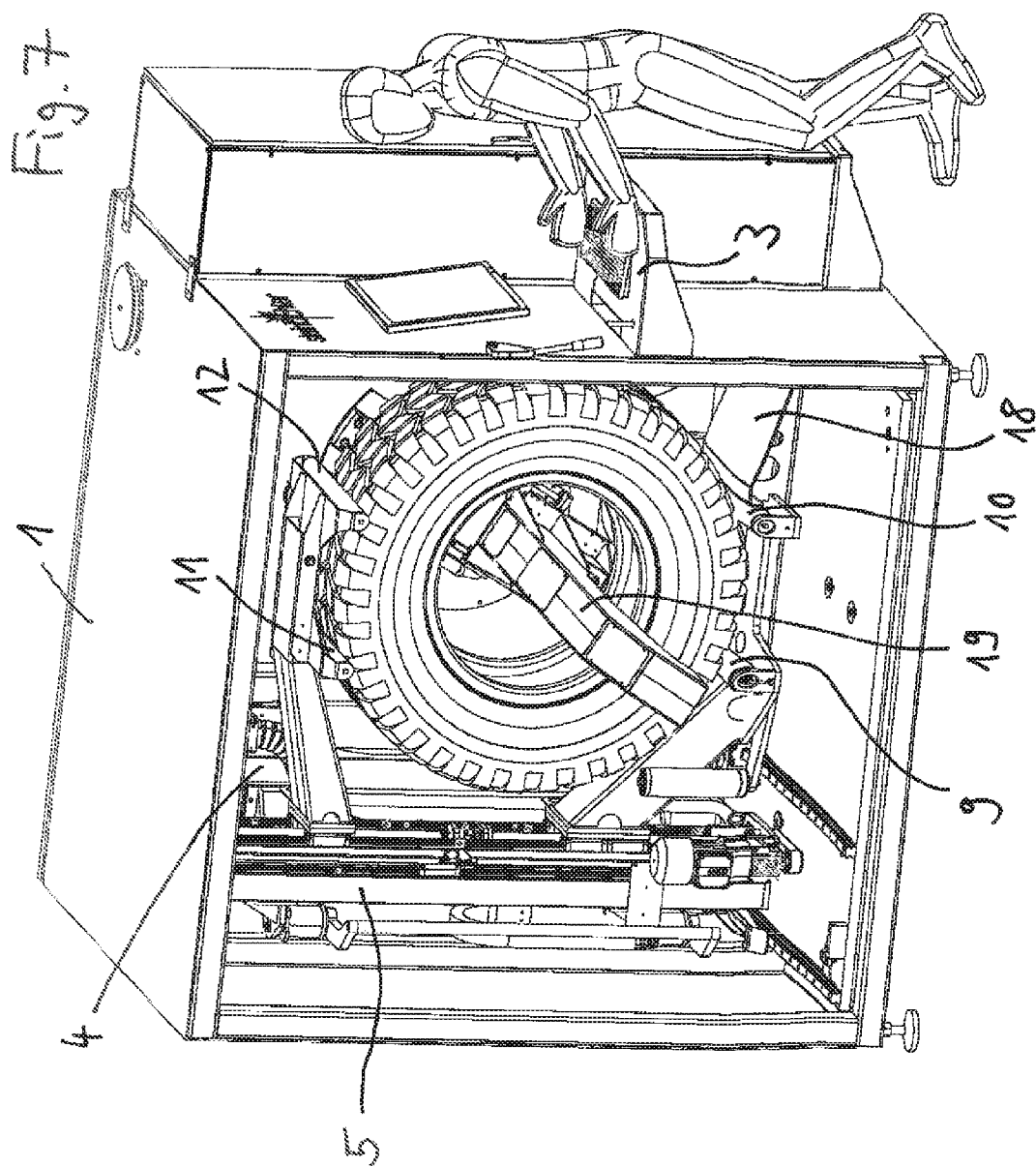

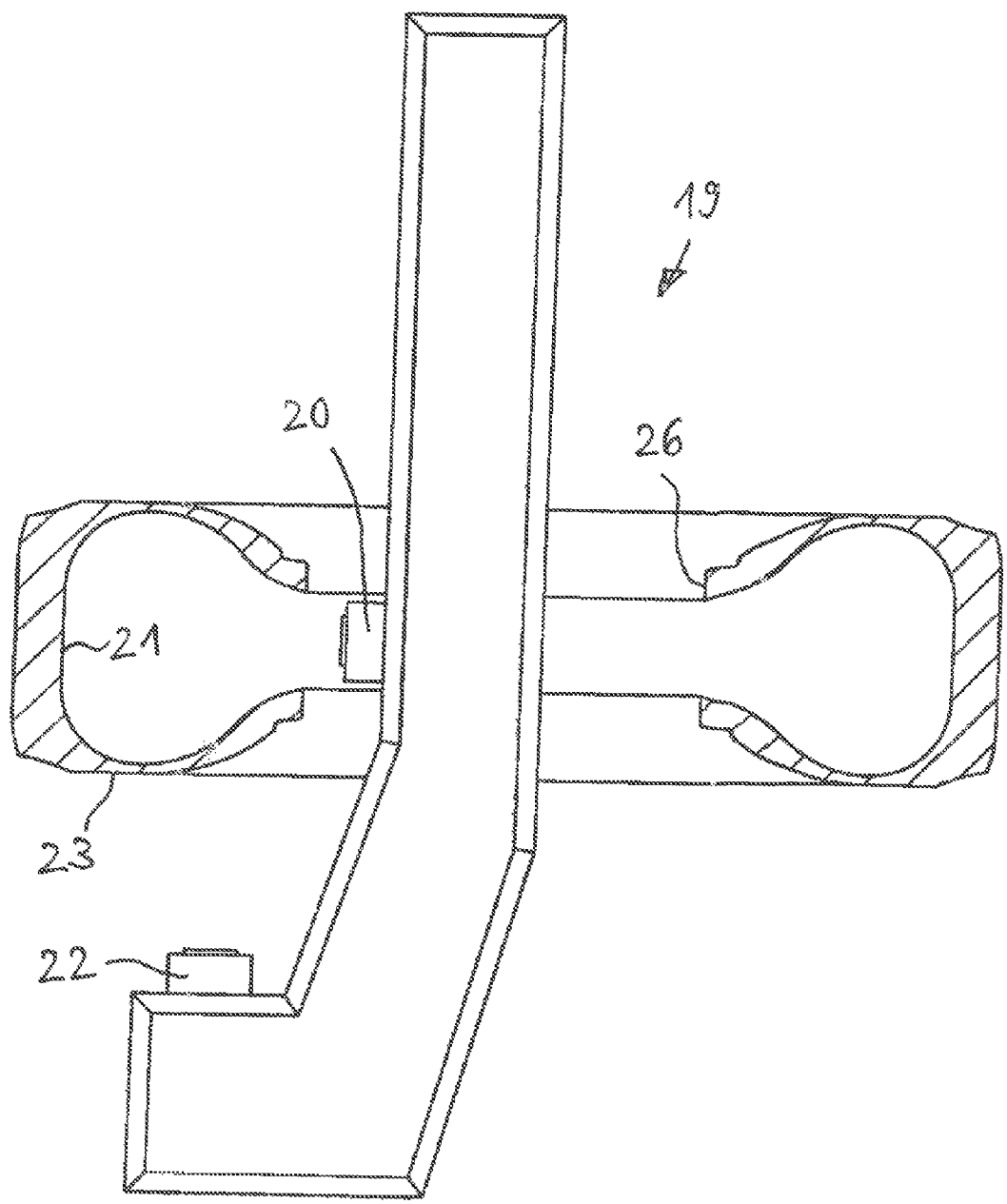

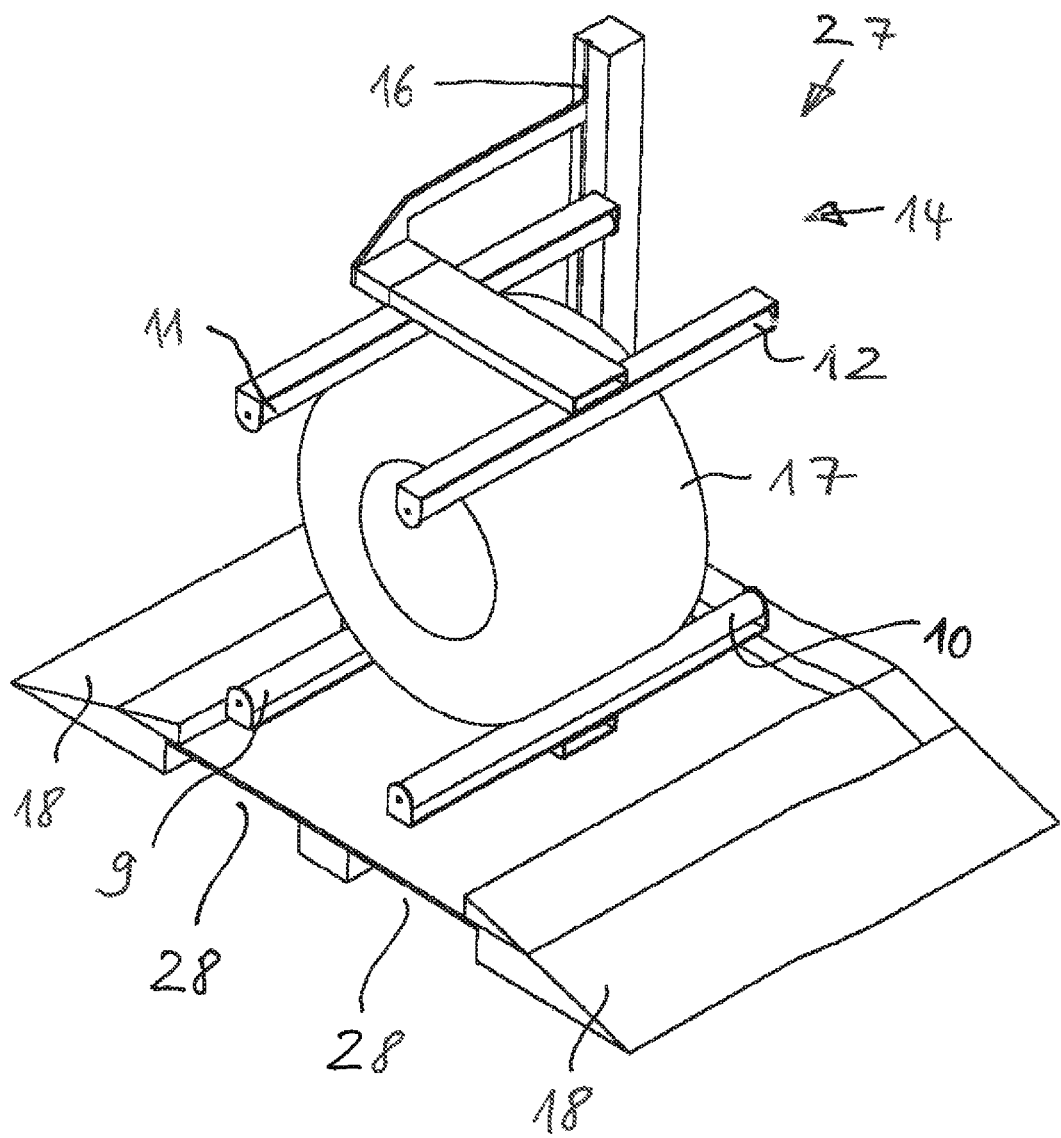

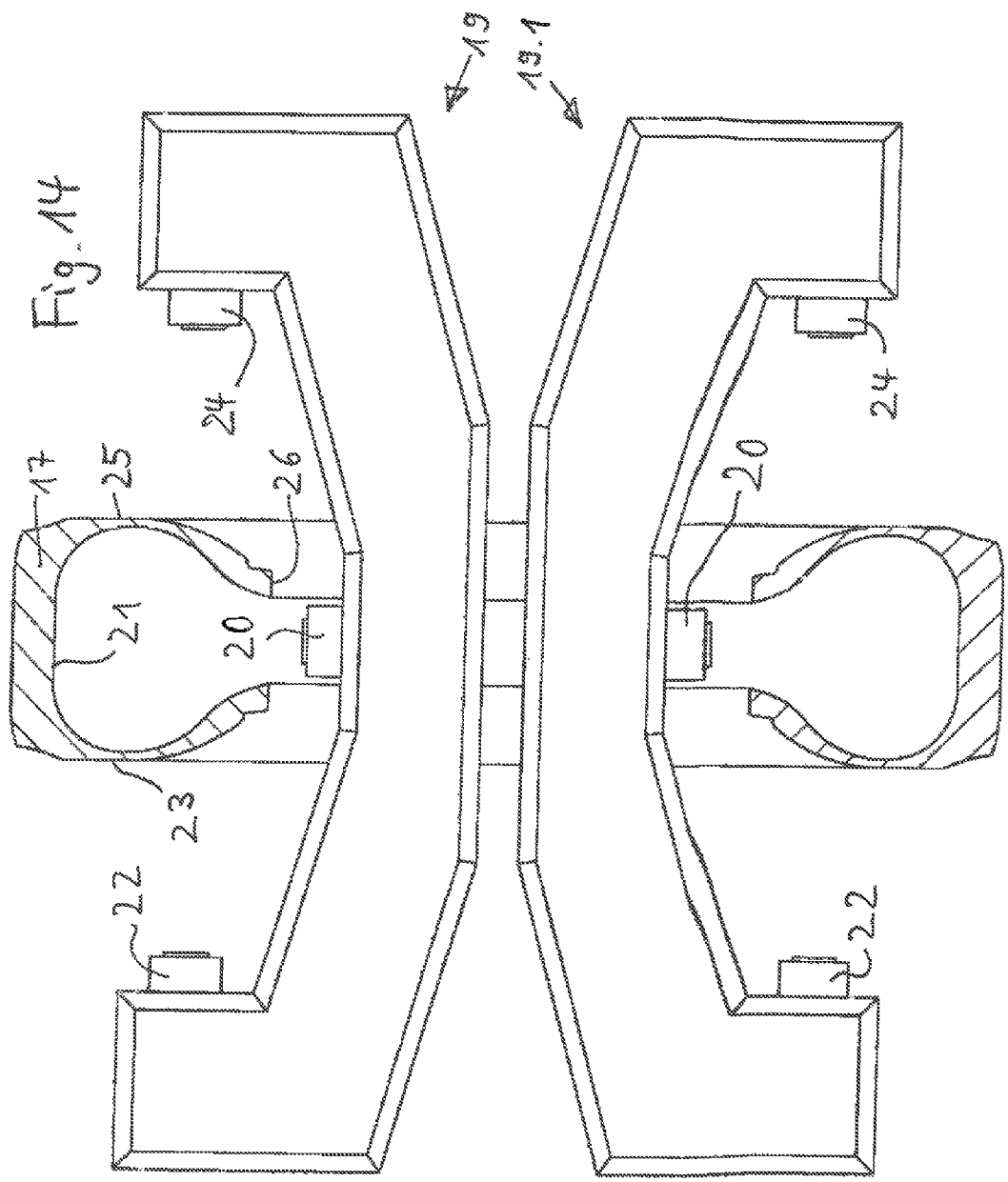

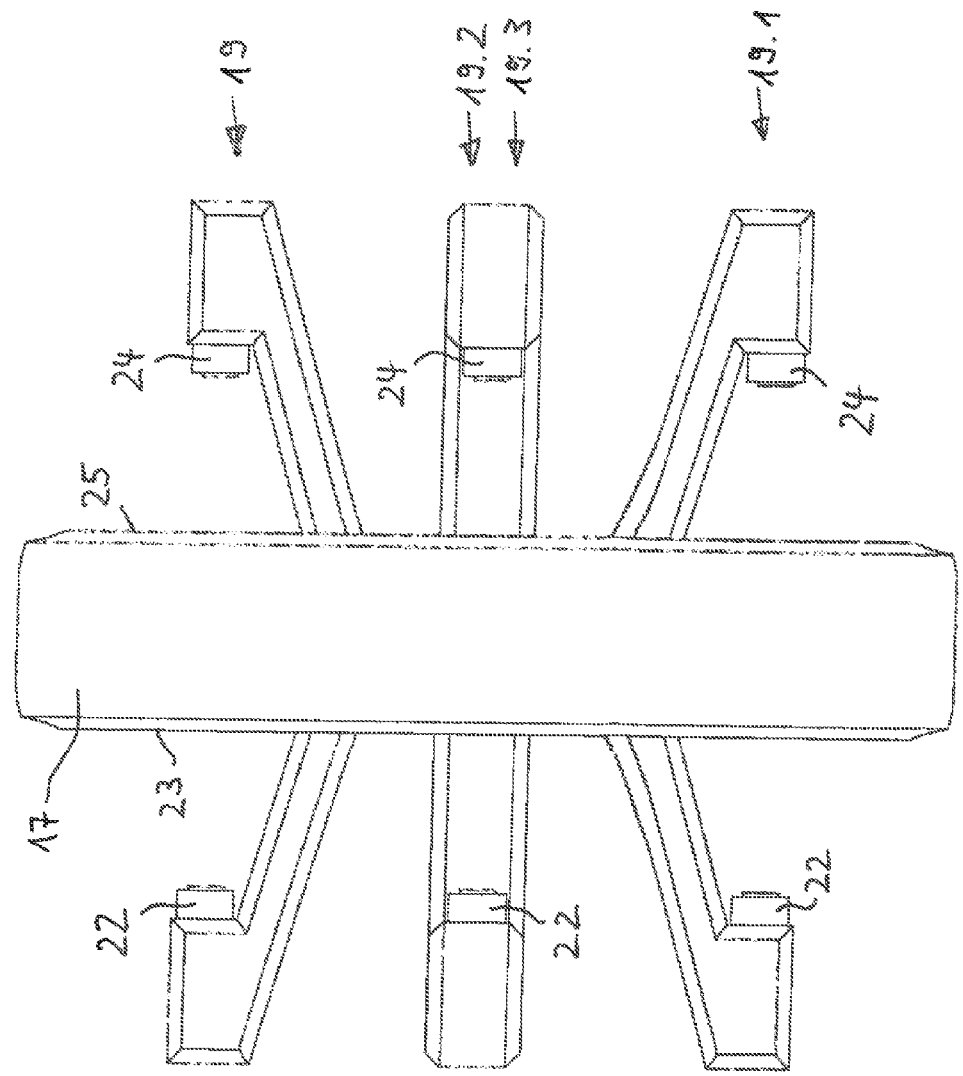

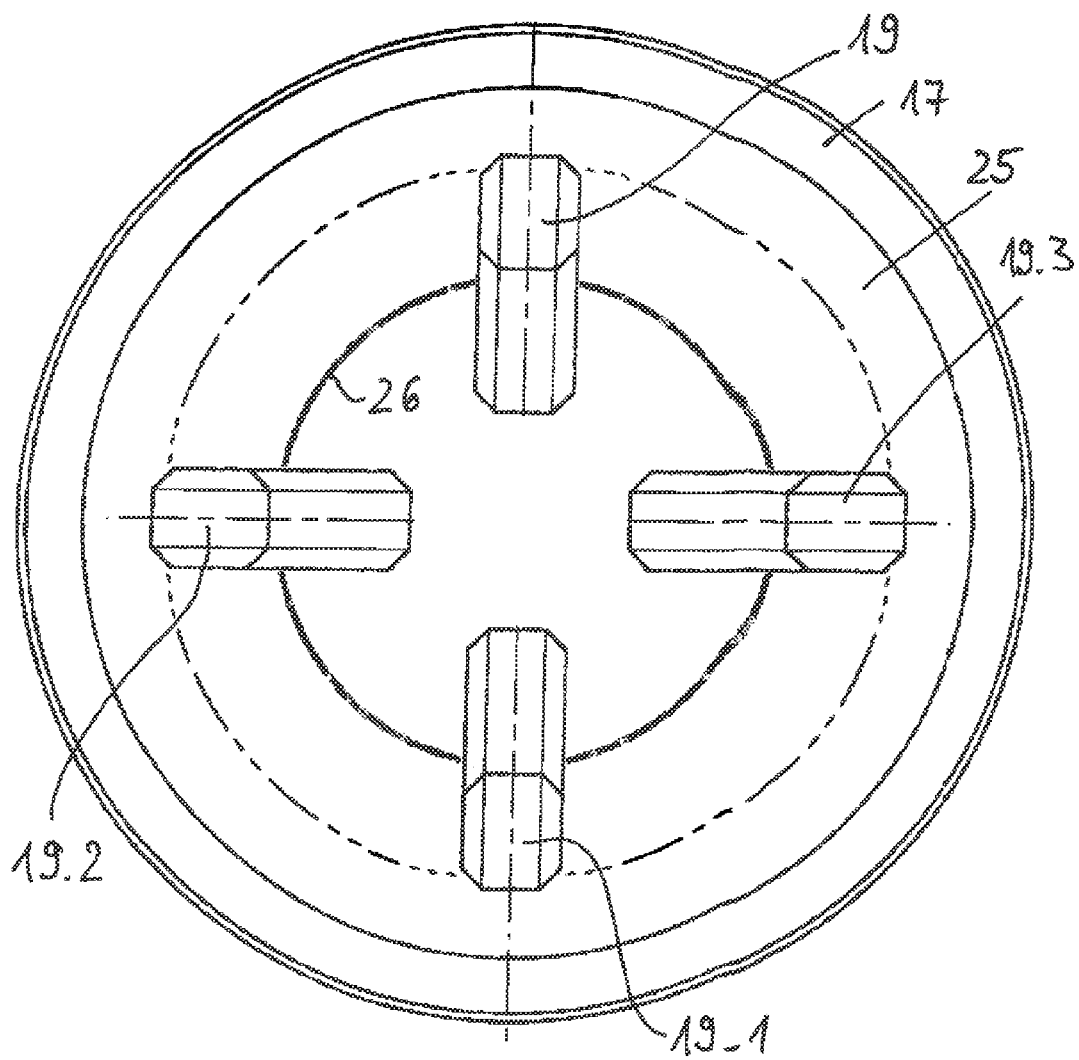

TIRE TESTING APPARATUS AND METHOD FOR TESTING A TIRE

BACKGROUND OF THE INVENTION

This invention relates to a tire testing device and a method for testing a tire.

From EP 1 043 578 A2 there is known a tire testing apparatus for the interferometric testing of a tire, comprising a vacuum chamber and one or more measuring heads. With this tire testing apparatus a testing method is carried out, in which the surface contour of the tire is compared with each other in two different states. The different states are generated by a change of the pressure or negative pressure in the vacuum chamber. The tire thereby experiences a load change, which at defective points effects a significant change of the surface contour, by which the defects in the tire can be determined.

To be able to perform this in a reliable and accurate manner, care must be taken that a change in contour which is not due to the change in load is avoided. This can be achieved by a construction of the tire testing apparatus as insensitive to vibrations as possible, which prevents disturbances and changes in position of the measuring head and/or the tire. Tensions and creep movements of the tire are attenuated as far as possible by the stable support thereof. Too strong own movements of the tire can lead to disturbances in the result images up to an exceedance of the narrow measurement range of the interferometric measurement.

In the interferometric testing apparatus known from EP 1 043 578 A2, the tire therefore is tested lying on its side wall, in order to ensure a rather full-surface support of the tire and in this way minimize vibrations and own movements. After positioning the tire, a waiting time may be required, which is dependent on the weight, size and inner structure of the tire as well as the introduced forces required for positioning the tire. Only after expiration of this waiting time testing can be started, in that the one or more measuring heads test the tire section by section. Usually, the tread is tested from inside in individual sectors, and the bead and the side wall are tested from outside in individual sectors. The measuring head typically is moved relative to the tire along the circumference of the tire, so that the entire tread and a side wall can be tested one after the other.

Thereafter, the tire must be lifted and turned over, in order to be able to also test the second side wall. This involves a considerable effort in large and heavy tires, which can have a weight of up to several tons. While being turned over, the tire experiences forces which can lead to renewed, slowly decreasing changes in contour. This may require a renewed waiting time before testing the second side wall.

To avoid this disadvantage, EP 1 355 142 A2 proposes to test the tire in a vertical, i.e. upright position. In this position, both side walls can be tested without turning over the tire. For testing the tire, one portion each is tested and subsequently the tire is turned on. In this way, the entire tire can be tested. For rotating the tire rollers are provided, on which the tire rests with its rim hole or with its tread.

In the process, however, the tire experiences non-uniform forces which can lead to pressure marks and whole-body deformations. Before interferometric testing, a waiting time also must be observed here, until these disturbances have decreased. After each rotation of the tire for testing the next section, new force relations exist, which necessitate further waiting times in part lasting several minutes.

From DE 203 14 939 U1 a tire testing apparatus is known, in which the tire is tested in vertical position, wherein the measuring heads can be moved along the side walls, in order to inspect various points of the tire. In the process, the tire is suspended on rollers on which it rests with its bead. This arrangement on the one hand involves the disadvantage of an ongoing deformation of the tire. On the other hand, the bearings inside the bead impede the optical and mechanical accessibility of the tire interior. The measuring head for observing the inside of the tire at the upper position cannot be brought into the ideal measurement position without obstacles. The upper inside of the tire is hidden by the bearings for a considerable part and therefore cannot be detected completely.

SUMMARY OF THE INVENTION

It is the object of the invention to propose an improved tire testing apparatus and an improved method for testing a tire.

In accordance with the invention, this object is solved by the features herein. The tire testing apparatus serves for the interferometric testing of a tire, in particular for shearography testing of a tire. It comprises a loading means for the tire, in particular a pressure chamber and/or negative-pressure chamber (vacuum chamber).

The tire testing apparatus furthermore comprises at least one measuring head. The measuring head is movable relative to the tire. It comprises a light source, preferably a light source for coherent light, in particular laser light, recording optics and an image sensor, preferably an area sensor, in particular a CCD sensor or a CMOS sensor. The measuring head also can include illumination optics. Furthermore, the measuring head can include a processing means for processing the recorded data. The recorded data can, however, also be processed in a separate processing means, in particular in a computer, for example in a PC. The processing means of the sensor or the separate processing means preferably comprises a memory, a calculating unit, an input unit and/or an output unit.

The tire testing apparatus furthermore comprises lower bearing elements, on which the tire can be positioned in vertical position. The tire rests on the lower bearing elements with its outer tread. Advantageously, a tire is tested without rim. When the tire is in the vertical position, its axis of rotation extends in horizontal direction. According to the invention, the tire testing apparatus comprises upper bearing elements which are movable relative to the lower bearing elements and which form a holder for the tire together with the lower bearing elements. When the tire rests on the lower bearing elements in vertical position, and when the upper bearing elements are moved relative to the lower bearing elements, the upper bearing elements at the same time move relative to the tire. The upper bearing elements can move away from the lower bearing elements and towards the same. Preferably, the upper bearing elements can move in vertical direction relative to the lower bearing elements. The arrangement can be made such that the upper bearing elements and/or the lower bearing elements are movable relative to the housing of the tire testing apparatus.

In operation, the upper bearing elements are moved relative to the lower bearing elements, until the upper bearing elements at the tire, which in the vertical position rests on the lower bearing elements with its tread, also rest against the tread of the tire. The relative movement between the upper bearing elements and the lower bearing elements can be continued, until the tire is held by the bearing elements with the required force.

During testing by the measuring head, the tire is at rest. It can thereby be achieved that the settling time for the tire occurs only once after loading. The entire testing time is reduced by the waiting times saved.

Advantageous developments are described herein.

One or more or all bearing elements preferably are formed as rollers.

Advantageously, the upper bearing elements or rollers are arranged on a pivotally mounted rocker. The rocker preferably is mounted eccentrically. It can thereby be achieved that one of the two upper bearing elements or one of the two upper rollers is located at a lower level than the other one. When the rocker is moved downwards relative to the lower bearing elements, the bearing element located at a lower level or the roller located at a lower level initially gets in contact with the tread of the tire. By a further relative movement of the rocker in downward direction, the rocker is pivoted, until the second bearing element initially located at a higher level or the second roller initially located at a higher level also rests against the upper tread of the tire. By the horizontal position of the rocker then achieved, it can be indicated that the two upper bearing elements or rollers rest against the tire. Advantageously, a sensor or a switch is provided, which terminates the drive for the relative movement of the upper bearing elements or rollers in downward direction, when the rocker reaches the horizontal position in which the tire is held by all bearing elements or rollers.

A further advantageous development is characterized in that the upper bearing elements or rollers and the lower bearing elements or rollers are adjustable in opposite directions. When the lower bearing elements or rollers are moved upwards and the upper bearing elements or rollers at the same time and to the same extent are moved downwards, it can be achieved that in the end position, in which the tire is held by all bearing elements or rollers, the horizontally extending middle axis of the tire takes the same position relative to the housing of the tire testing apparatus for each tire size. The tire then always is centered at the same point independent of its size in the position taken.

According to a further advantageous development, the upper bearing elements or rollers and the lower bearing elements or rollers are adjustable in the same direction. This is advantageous in particular when the upper and lower bearing elements form a holder for the tire. They can then be adjusted in the same direction, in order to position the tire in its desired height. This can be advantageous in particular when an additional measuring and/or testing method is carried out and/or when the tire should be centered in the height.

Advantageously, a control means for the bearing elements is arranged on a holder for the upper bearing elements or rollers. The control means can comprise one or more control knobs or consist of one or more control knobs. By the control means, the vertical movement of the bearing elements or rollers can be controlled.

The bearing elements or rollers preferably are arranged on a movable holding frame. The holding frame can be mounted in a longitudinally shiftable way. Advantageously, the holding frame is movable out of the housing of the tire testing apparatus and is movable into the housing of the tire testing apparatus. It can be moved out of the housing of the tire testing apparatus, in order to position a tire on the lower bearing elements. The holding frame can be moved into the housing of the tire testing apparatus together with the tire. It is possible to initially move the upper bearing elements or rollers relative to the lower bearing elements, in order to form a holder for the tire, before the holding frame is moved into the housing of the tire testing apparatus. It is, however, also possible to initially move the holding frame into the housing of the tire testing apparatus and only then move the upper bearing elements relative to the lower bearing elements, in order to form a holder for the tire.

A further advantageous development is characterized in that the bearing elements or rollers are arranged on a column which is pivotally mounted on the holding frame. In particular, this provides for swinging the bearing elements or rollers out of the housing of the tire testing apparatus, when the holding frame is located in the vicinity of an opening of the housing.

When the bearing elements are formed as rollers, the tire can be rotated in circumferential direction. As a result, additional measuring and/or testing methods can be integrated into the tire testing apparatus. As additional testing methods, in particular a nail hole search, preferably with a high-voltage sensor, an X-ray examination, a geometric measurement of the outer contour and/or the inner contour of the tire, a geometric measurement of the thickness of the tire, a surface examination of the tire by an operator and/or by an image processing system and/or a machine recognition of text and/or patterns on the tire can be taken into consideration. When a nail hole search is carried out with a high-voltage sensor, it is advantageous when one of the rollers for the integrated high-voltage test is grounded. The additional measurement and/or testing methods can be effected simultaneously with the interferometric testing and/or before the interferometric testing and/or after the interferometric testing. In particular in the case of a surface examination it is advantageous when a means for lifting the tire to an ergonomic working height is provided. The results of the additional measuring and/or testing method can be displayed on a screen. They can be displayed together with the results of the interferometric testing or separately.

Advantageously, one bearing element is formed as drivable roller. This provides for rotating the tire by a drive about its horizontally extending axis of rotation. During the rotation of the tire, which can take place inside the housing of the tire testing apparatus or outside this housing, a further testing of the tire can take place. It can be advantageous when the tire is rotated when it is located outside the housing of the tire testing apparatus.

A further advantageous development is characterized in that the one or more measuring heads are arranged on a horizontally extending measuring head carrier. The measuring head carrier has a horizontal extension. It preferably is arranged in the tire testing apparatus such that it protrudes into the opening of the tire or reaches through the opening of the tire, when the tire is in the measuring position.

It is, however, also possible that several horizontally extending measuring head carriers are provided. On each measuring head carrier, one or more measuring heads then are arranged. The measuring head carriers have a horizontal extension. They preferably are arranged in the tire testing apparatus such that they protrude into the opening of the tire or reach through the opening of the tire, when the tire is in the measuring position.

On the measuring head carrier or on each measuring head carrier, at least one measuring head preferably is arranged for testing the inner tread of the tire. Advantageously, one measuring head is arranged on the measuring head carrier or one measuring head each is arranged on each measuring head carrier for testing the inner tread of the tire.

Advantageously, at least one measuring head is arranged on the measuring head carrier or on each measuring head carrier for testing the outer side wall of the tire. Preferably, one measuring head is arranged on the measuring head carrier or one measuring head each is arranged on each measuring head carrier for testing an outer side wall of the tire. The one or more measuring heads can rigidly be arranged on the one or more measuring head carriers. They can, however, also be pivotally arranged on the one or more measuring head carriers.

According to another advantageous development, at least one measuring head is arranged on the measuring head carrier or on each measuring head carrier for testing the other outer side wall of the tire. Advantageously, one measuring head is arranged on the measuring head carrier or one measuring head each is arranged on each measuring head carrier for testing the other outer side wall of the tire. The one or more measuring heads can rigidly be arranged on the one or more measuring head carriers. It is, however, also possible that the one or more measuring heads are pivotally arranged on the one or more measuring head carriers.

Advantageously, the one or more measuring head carriers are adjustable in radial direction. The one or more measuring head carriers can be adjusted in radial direction, when the tire has reached its testing position. The radial adjustment of the one or more measuring head carriers can be carried out in dependence on the tire size, in particular in dependence on the outer tire diameter and/or on the inner tire diameter. It can, however, also be advantageous when the one or more measuring head carriers are not adjustable in radial direction. This is advantageous in particular when the tire testing apparatus only is used for testing types of tire which slightly differ from each other, so that an adjustability in radial direction is not required.

According to another advantageous development, one or more or all measuring heads include recording optics with variable focal length. This provides for varying the field of vision of the one or more measuring heads.

The measuring head carrier or the measuring head carriers preferably is/are pivotable about its or their longitudinal axes. When the one or more measuring head carriers is/are pivoted about its or their horizontally extending longitudinal axes, various, preferably all regions of the tire can be tested. It can, however, be advantageous when several measuring head carriers are present, which are not pivotable. This is advantageous in particular when on the several measuring head carriers measuring heads are arranged, which cover the entire tire region to be tested.

According to another advantageous development, the tire testing apparatus comprises a pallet with lower bearing elements or rollers on which the tire can be positioned in vertical position, and with upper bearing elements or rollers which are movable relative to the lower bearing elements or rollers and which together with the lower bearing elements or rollers form a holder for the tire, wherein the pallet is connectable with the tire testing apparatus. One or more or all bearing elements preferably are formed as rollers. The upper bearing elements or rollers can be arranged on a pivotally mounted rocker. The upper bearing elements or rollers and the lower bearing elements or rollers can be adjustable in opposite directions. On a holder for the upper bearing elements or rollers, a control means for the bearing elements can be arranged. A bearing element can be formed as drivable roller.

In operation of the tire testing apparatus, the tire initially can be connected with the pallet such that the lower bearing elements or rollers and the upper bearing elements or rollers form a holder for the tire. In this position it can be waited, until the disturbances resulting from the connection of the tire with the pallet have decreased. The pallet then can be connected with the tire testing apparatus, and the testing of the tire can be carried out. In this way, it is possible to utilize the waiting time until decrease of the disturbances resulting from the connection of the tire with the pallet for testing other tires.

Advantageously, the pallet is connectable with a movable holding frame of the tire testing apparatus, which is movable out of the housing of the tire testing apparatus and is movable into the housing of the tire testing apparatus, wherein the movable holding frame can be pivotable with respect to the housing of the tire testing apparatus and/or be mounted in a longitudinally shiftable way.

The object underlying the invention furthermore is solved by a method for testing a tire with a tire testing apparatus according to the invention, in which the one or more measuring head carriers are pivoted in one direction about their longitudinal axes when testing a tire, and the one or more measuring head carriers are pivoted in the opposite direction, when testing the next tire. The tire testing apparatus for carrying out this method comprises one or more horizontally extending measuring head carriers, on which the one or more measuring heads are arranged and which is/are pivotable about its or their longitudinal axes.

The object underlying the invention finally is solved by a method for testing a tire with a tire testing apparatus according to the invention, in which the movable holding frame is moved into the housing of the tire testing apparatus, the picture is taken by the or a measuring head for testing the inner tread of the tire, and the movement of the movable holding frame is terminated when the measuring head is positioned opposite the inner tread of the tire. The tire testing apparatus for carrying out this method comprises a movable holding frame on which the bearing elements or rollers are arranged, and one or more measuring head carriers on which a measuring head for testing the inner tread of the tire is arranged. By means of this method, the one or more measuring head carriers and with the same the one or more measuring heads can be centered before the inner tread of the tire. The movable holding frame can be moved in to the housing of the tire testing apparatus manually or by motor.

Advantageously, the image of the or a measuring head for testing the inner tread of the tire is transmitted to a screen. This enables an operator to monitor the position of the tire relative to the measuring head and stop the movement of the holding frame, when the measuring head is positioned opposite the inner tread of the tire. The screen is located in the field of vision of the operator. Advantageously, the screen is arranged on the inside of a housing wall.

BRIEF DESCRIPTION OF THE DRAWINGS

Exemplary embodiments of the invention will be explained in detail below with reference to the attached drawing, in which:

FIG. 7 shows the tire testing apparatus of FIGS. 1 to 6 in a representation corresponding to FIG. 6 with a horizontally extending measuring head carrier which is pivoted about is longitudinal axis by 60° in anti-clockwise direction, FIGS. 8A, 8B and 8C each show a part of the tire testing apparatus of FIGS. 1 to 7 in a schematic side view, FIG. 10 shows a tire and a modified measuring head carrier of the tire testing apparatus in a side view and in a sectional view from above, FIGS. 11A and 11B each show a part of the tire testing apparatus with a control means for the bearing elements in a perspective view, FIG. 12 a pallet for the tire testing apparatus of FIGS. 1 to 11, FIGS. 13A, 13B and 13C each show a part of the tire testing apparatus with rollers, which are arranged on a pivotally mounted rocker, in various side views, FIG. 14 shows a modified embodiment of the tire testing apparatus with two measuring head carriers of the type shown in FIG. 9 in a side view and in a sectional view from above, FIG. 15 shows a further modification of the tire testing apparatus with four measuring head carriers of the type shown in FIG. 9 in a side view from above, FIG. 16 shows the modification of FIG. 15 in a view from the front.

DESCRIPTION OF THE PREFERRED EMBODIMENTS

Figure 1:
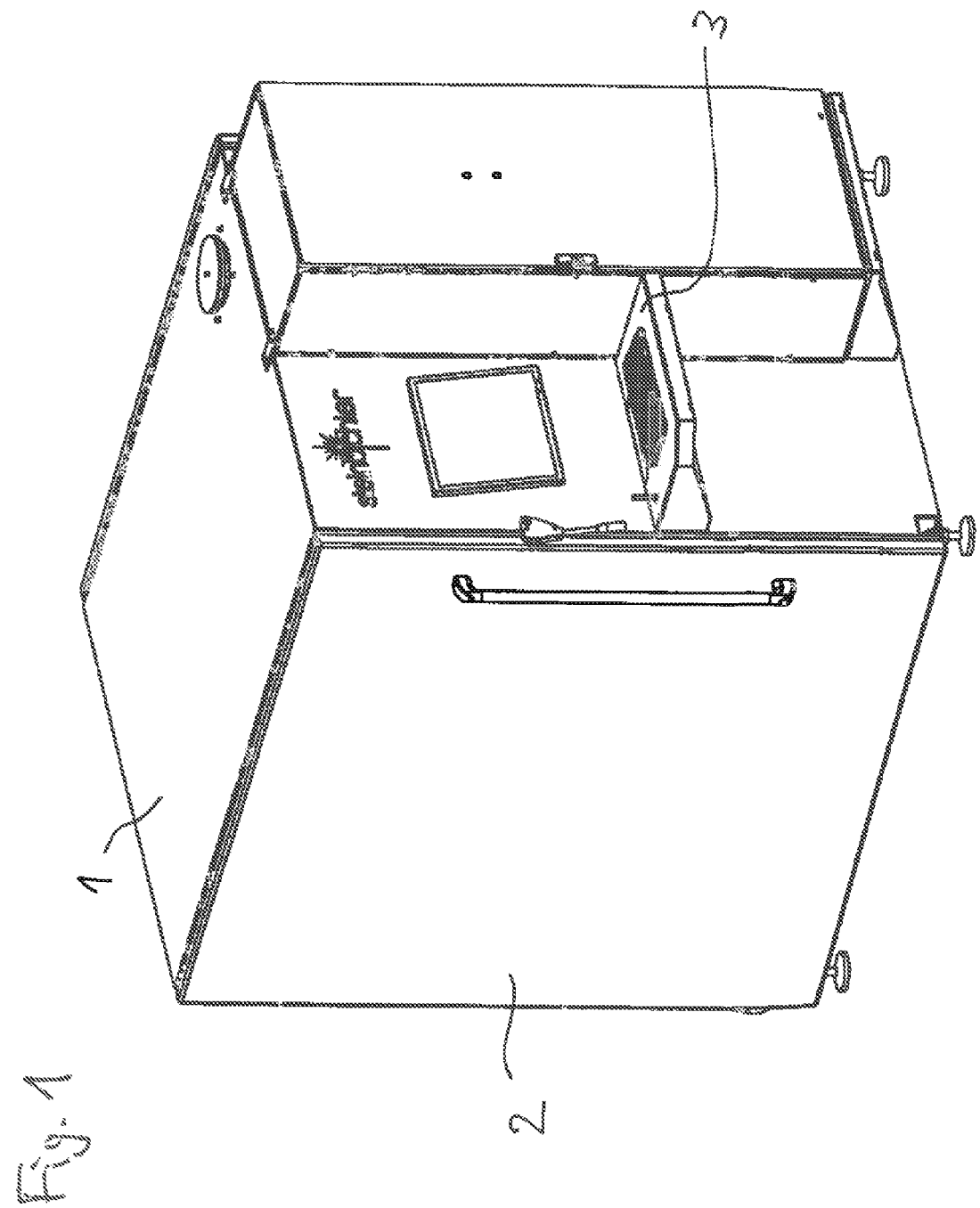
FIG. 1 shows a tire testing apparatus in a perspective representation.

The tire testing apparatus shown in the Figures comprises a housing 1 on which a door 2 is pivotally mounted. The door 2 covers an opening in a side face of the housing 1. Furthermore, a control desk 3 with a screen, a keyboard and a joystick is present on the outside of the housing.

The housing 1 is formed as negative-pressure chamber. When the door 2 is closed, a negative pressure can be generated in the housing 1 of the tire testing apparatus.

In the housing 1, a movable holding frame 4 is arranged. The holding frame 4 comprises a vertical column 5, lower bearing elements 7 and upper bearing elements 8.

The column is located on a side of the opening which is closed by the door 2. The lower bearing elements are formed as rollers 9, 10. The upper bearing elements 8 are formed as rollers 11, 12. The holding frame 4 is longitudinally shiftably mounted in the housing 1. The shifting direction extends horizontally and in a direction vertical to the plane of the opening and the closed door 2.

The lower rollers 9, 10 are mounted on a lower holder 13. The axis of rotation of the rollers 9, 10 extends horizontally rotatably and parallel to the shifting direction of the holding frame 4. Correspondingly, the upper rollers 11, 12 are rotatably mounted on an upper holder 14. The axes of rotation of the upper rollers 11, 12 extend horizontally and parallel to the axes of rotation of the lower rollers 9, 10.

The lower holder 13 is longitudinally shiftably mounted on the column 5 of the holding frame 4. The shifting axis 15 of the lower holder 13 extends in vertical direction. It is located at the column 5 of the movable holding frame 4. The upper holder 14 is longitudinally shiftably mounted on the column of the holding frame 4. The shifting axis 16 of the upper holder 14 extends in vertical direction. It is located at the column 5 of the movable holding frame 4. The shifting axes 15, 16 can be aligned with each other.

The holders 13, 14 and with them the bearing elements 7, 8 formed as rollers 9, 10, 11, 12 are adjustable in opposite directions. When the lower holder 13 is moved along its shifting axis 15, the upper holder 14 at the same time is moved in the opposite direction and to the same extent.

Figure 2:
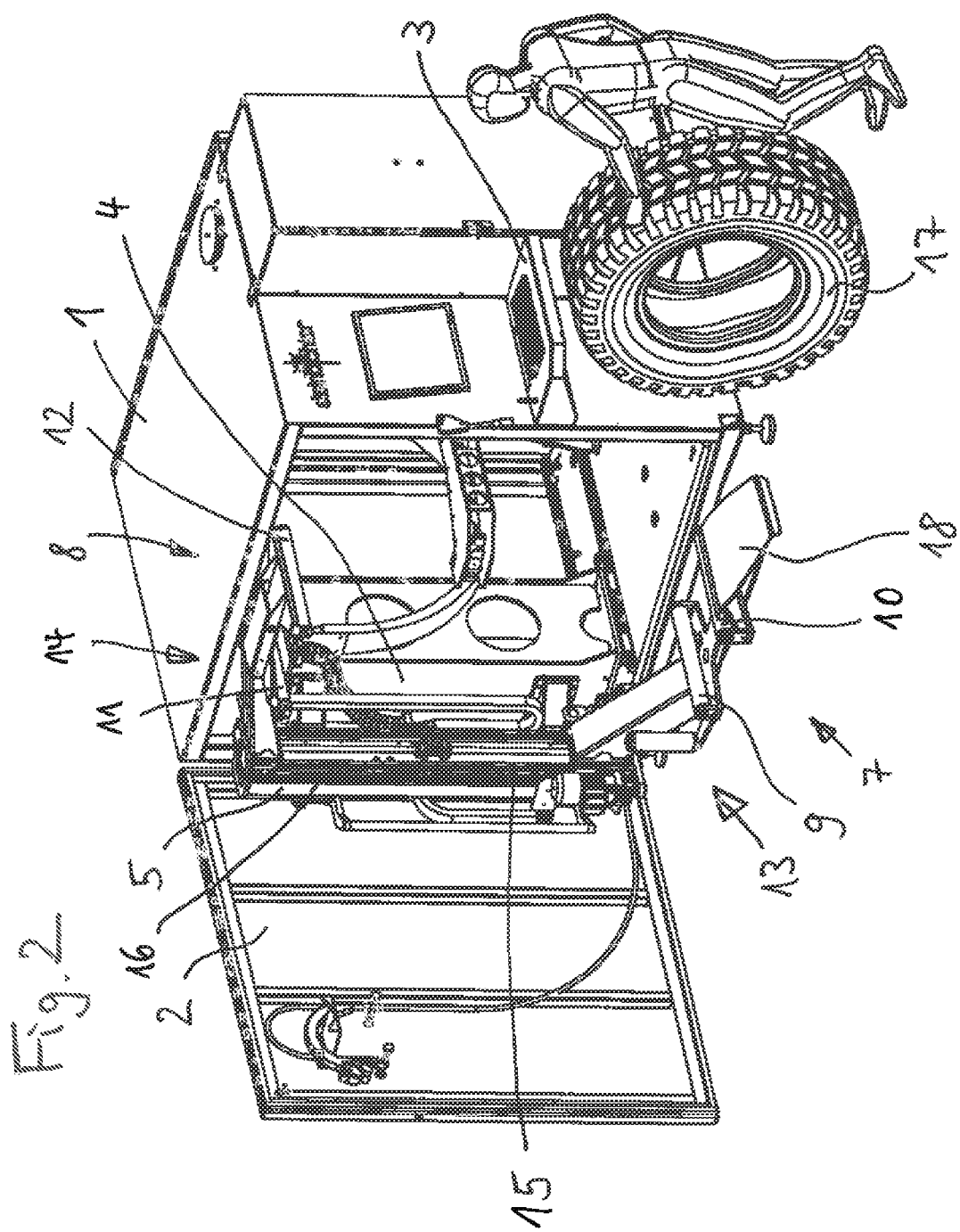
FIG. 2 shows the tire testing apparatus of FIG. 1 with open door.
Figure 8A:
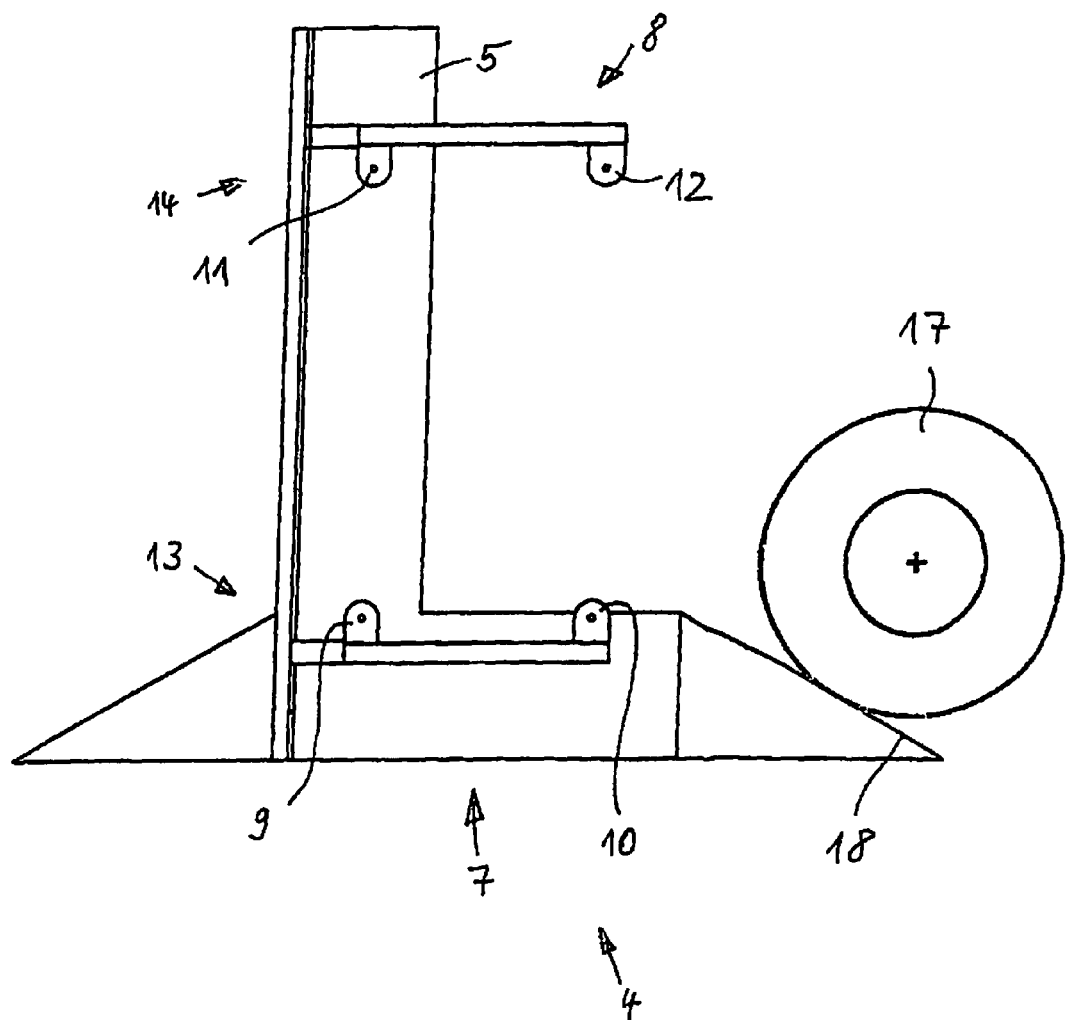

In operation, a tire 17 is rolled in vertical position to the lower rollers 9, 10, as shown in FIGS. 2 and 8*a*. Before the roller 10 a ramp 18 is arranged, which bridges the difference in height to the roller 10.

Figure 3:
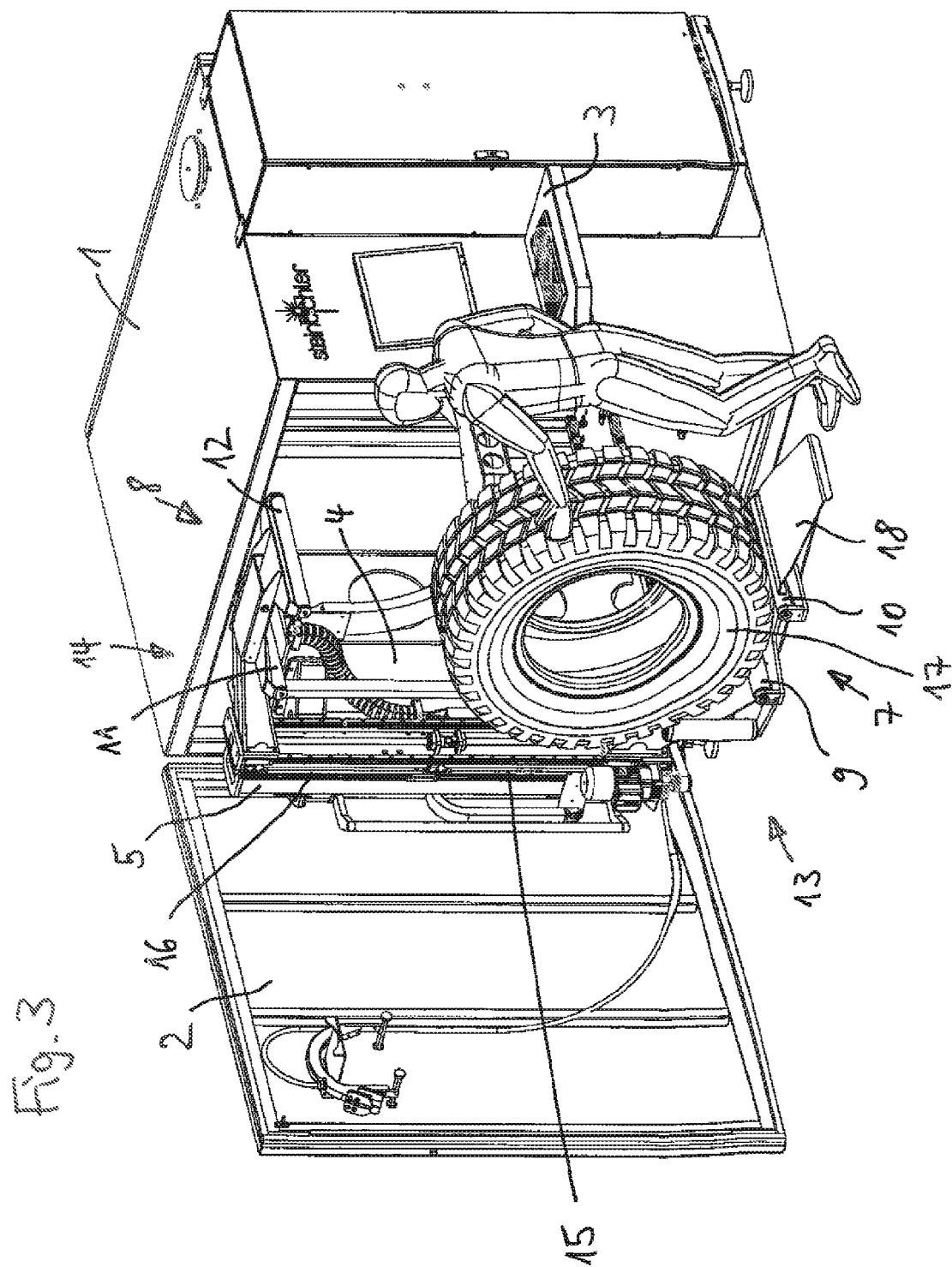
FIG. 3 shows the tire testing apparatus of FIGS. 1 and 2 with a tire which is positioned on the lower rollers in vertical position.
Figure 8B:
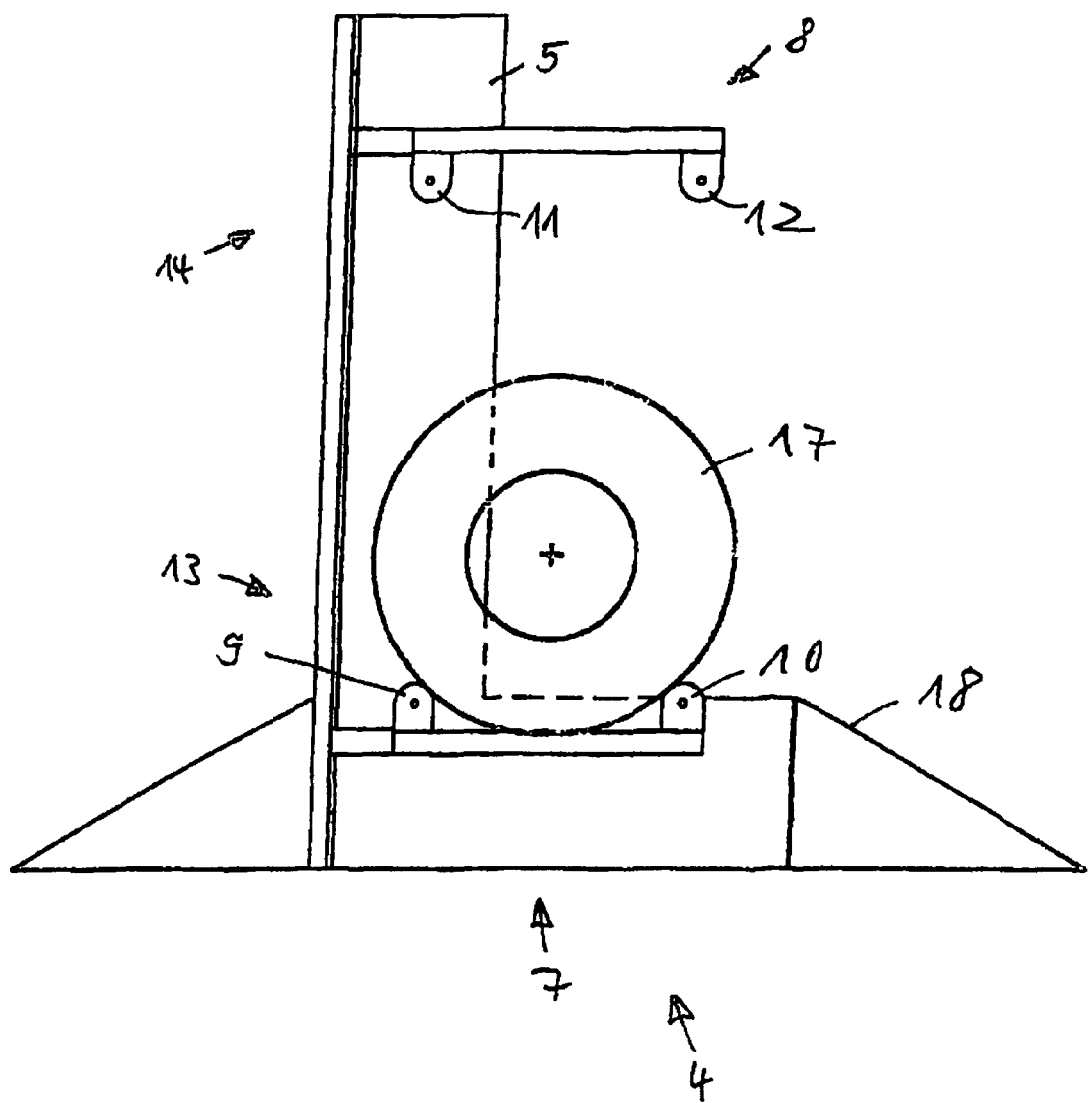

The tire 17 is rolled over the ramp 18 onto the lower rollers 9, 10 and positioned there. It rests on the lower rollers 9, 10 with its outer tread, as shown in FIGS. 3 and 8*b*. The axis of rotation of the tire 17 extends parallel to the axes of rotation of the rollers 9, 10.

Figure 4:
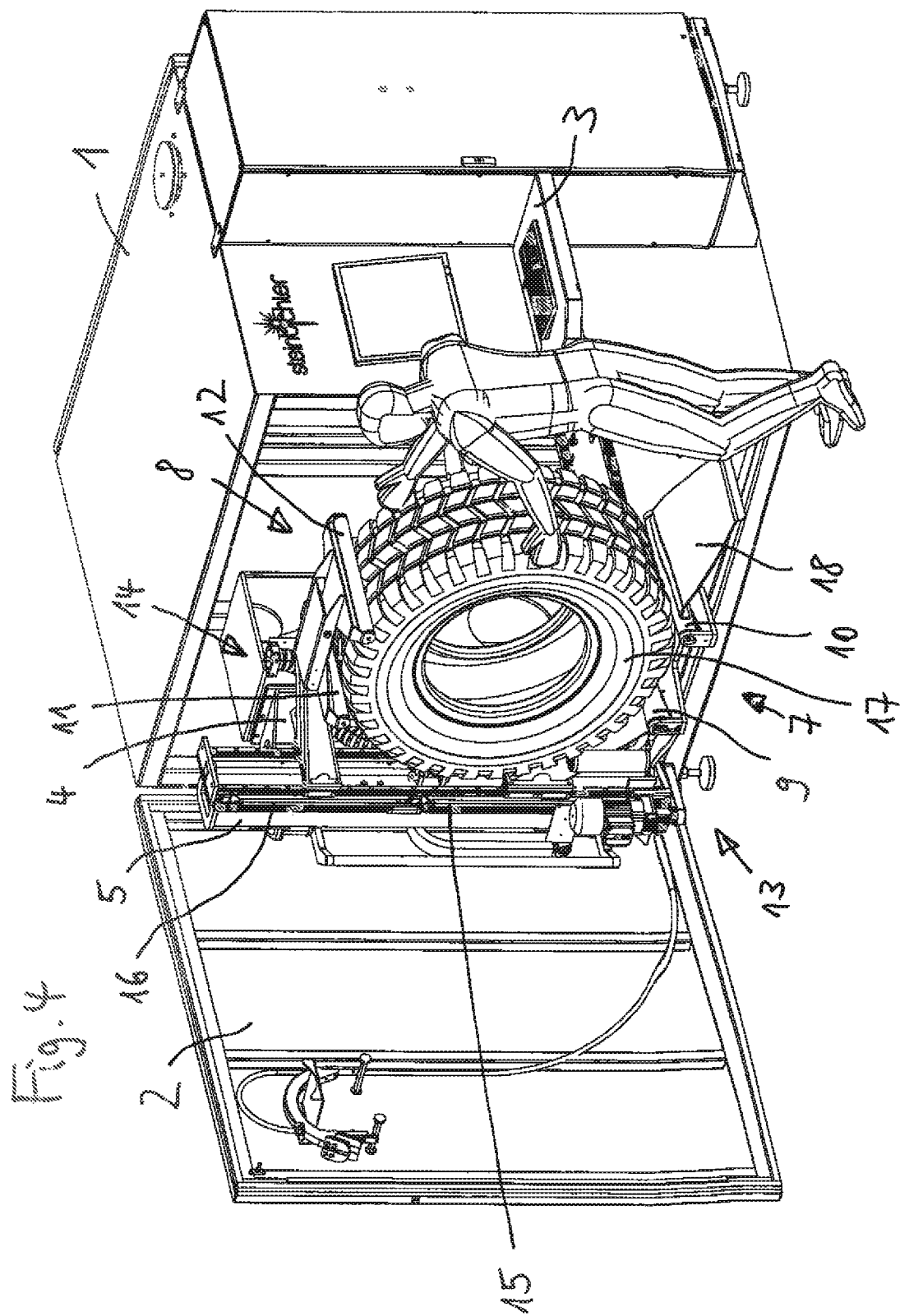
FIG. 4 shows the tire testing apparatus of FIGS. 1 to 3 with a tire which is held by the lower and upper rollers.
Figure 8C:
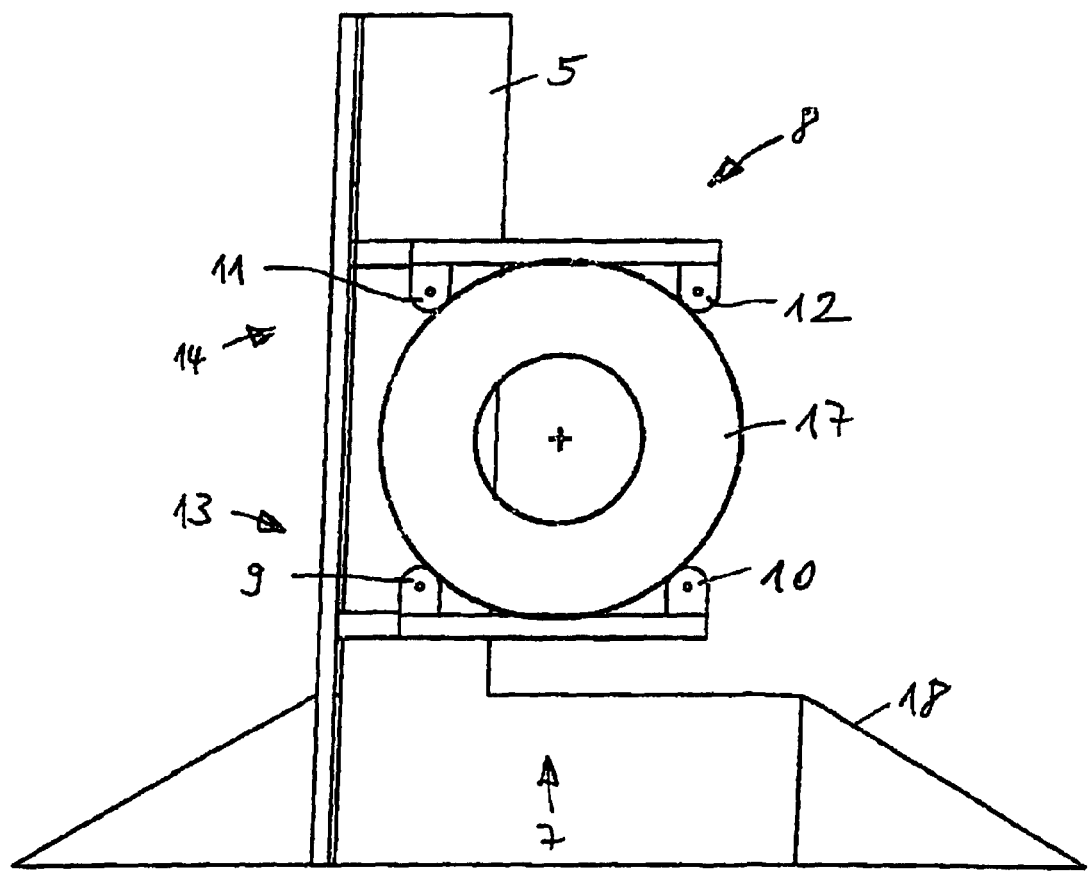

Subsequently, the upper rollers 11, 12 are moved relative to the lower rollers 9, 10. The lower holder 13 is moved upwards along its shifting axis 15. At the same time and to the same extent, the upper holder 14 is moved downwards along its shifting axis 16. This movement in opposite direction, which is effected by one or more motors, is continued, until the upper rollers 11, 12 also rest against the outer tread of the tire 17, so that the rollers 9, 10, 11, 12 form a holder for the tire 17, as shown in FIGS. 4 and 8*c*.

Figure 5:
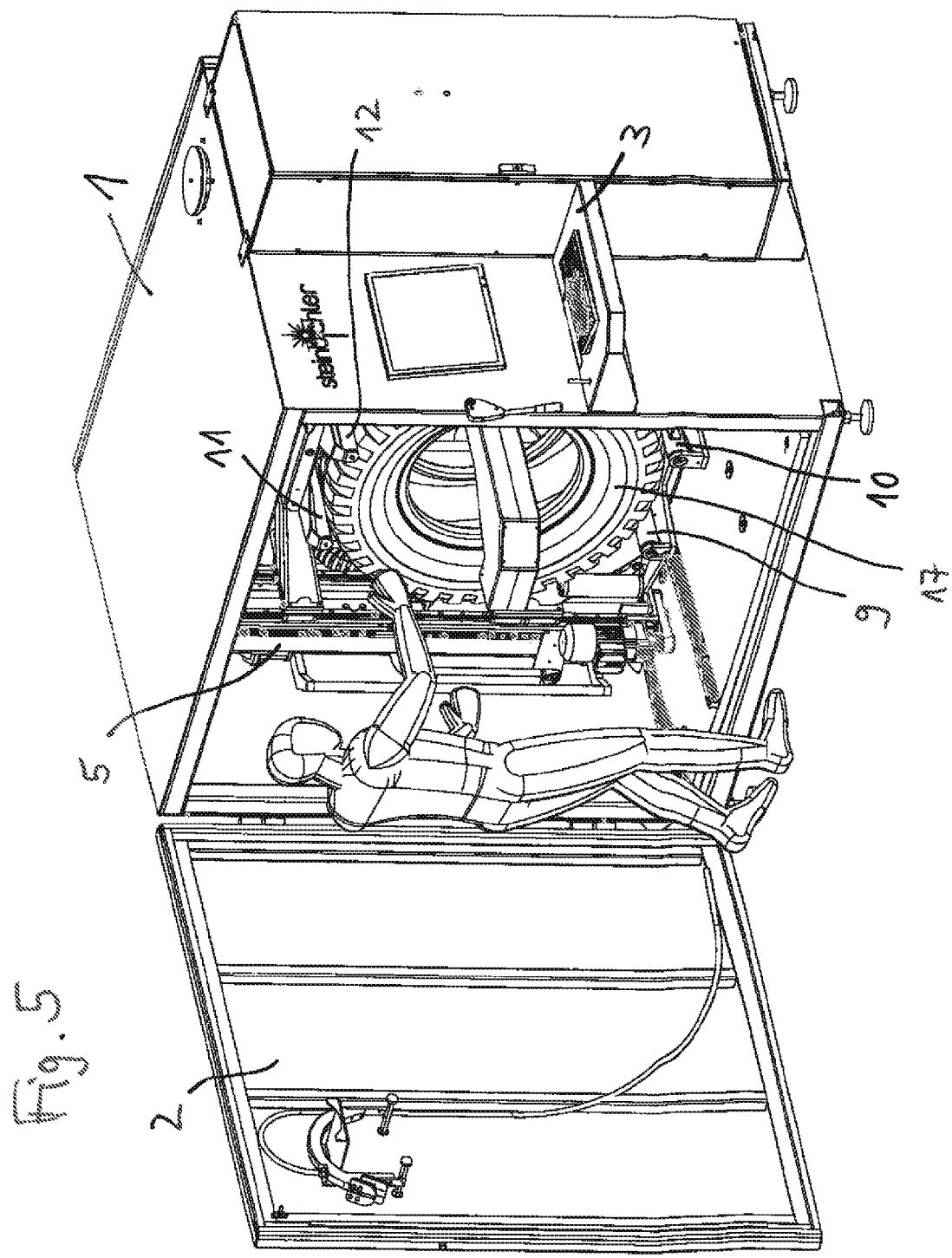
FIG. 5 shows the tire testing apparatus of FIGS. 1 to 4 with a tire which is pushed into the tire testing apparatus together with a movable holding frame.

Subsequently, the holding frame 4 and the tire 17 connected with the same are moved into the housing 1. This can be effected by a motor. Instead or in addition, the holding frame 4 with the tire 17 can be pushed in by hand, as shown in FIG. 5.

In the housing 1, a horizontally extending measuring head carrier 19 is present. On the measuring head carrier 19, as shown in particular in FIG. 9, a first measuring head 20 is arranged for testing the inner tread 21 of the tire 17 as well as a second measuring head 22 for testing an outer side wall 23 of the tire 17, and a third measuring head 24 for testing the other outer side wall 25 of the tire 17. The measuring heads 20, 22, 24 each comprise one or more laser light sources, in particular laser diodes, recording optics and an area sensor. It is advantageous when the focal length of the recording optics is variable. The field of vision of the camera, which comprises the recording optics and the area sensor, thereby can be adapted to the distance and/or the size of the region to be recorded. The measuring heads 20, 22, 24, in particular the measuring heads 22, 24, can be pivotable.

The measuring head carrier 19 is adjustable in radial direction r. The radial direction extends vertical to the longitudinal direction I of the measuring head carrier 19 and hence also vertical to the axis of rotation of the tire 17.

When the holding frame 4 with the tire 17 is pushed into the housing 1 of the tire testing apparatus, the measuring head carrier 19 is in a position in which it can pass through the opening 26 of the tire 17. To make this possible, the radial extension a of the measuring head carrier 19 is smaller than or at best equal to the diameter or the clear width b of the opening 26 of the tire 17.

Figure 9:
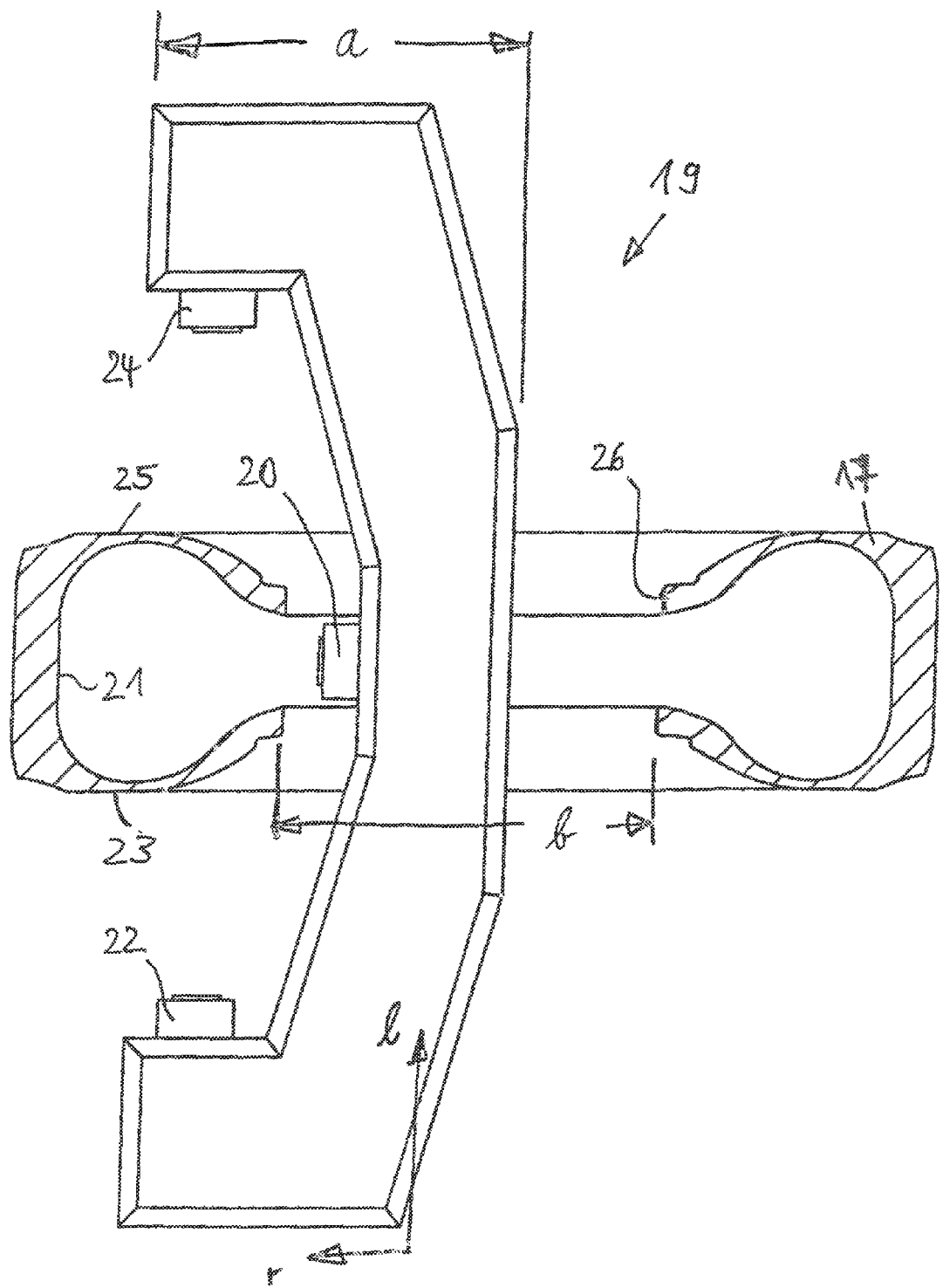
FIG. 9 shows the tire and the measuring head carrier of the tire testing apparatus in a side view and in a sectional view from above.

When the tire 17 connected with the holding frame 4 has reached the middle of the measuring head carrier 19 (see FIG. 9), in which the first measuring head 20 lies in the opening 26 of the tire 17 and is positioned opposite the inner tread 21 of the tire 17, the movement of the holding frame 4 is stopped. The optical system of the first measuring head 20 then is directed to the inner tread 21 of the tire 17. The measuring head carrier 19 now is shifted to the outside in radial direction r, until the position shown in FIG. 9 is reached. In this position, the measuring heads 22, 24 are located opposite the associated outer side faces 23, 25 of the tire 17. The outer side faces 23, 25 hence lie in the field of vision of the recording optics of the measuring heads 22, 24.

The holding frame 4 can be moved into the housing 1 manually or by motor. The image taken by the first measuring head 20 can serve to position this first measuring head 20 opposite the inner tread 21 of the tire 17. For this purpose, this image can be evaluated in a processing means, and the manual or motorized movement of the holding frame 4 can be terminated, when the measuring head 20 is positioned opposite the inner tread 21 of the tire 17. Instead or in addition, the image taken by the first measuring head can be transmitted to a screen. The screen is located in the field of vision of the operator. Preferably, the screen is mounted on the inside of the rear wall of the housing 1 (not shown in the drawing). The operator can terminate the motorized or manual movement of the movable holding frame 4, when the measuring head is positioned opposite the inner tread 21 of the tire 17.

Figure 6:
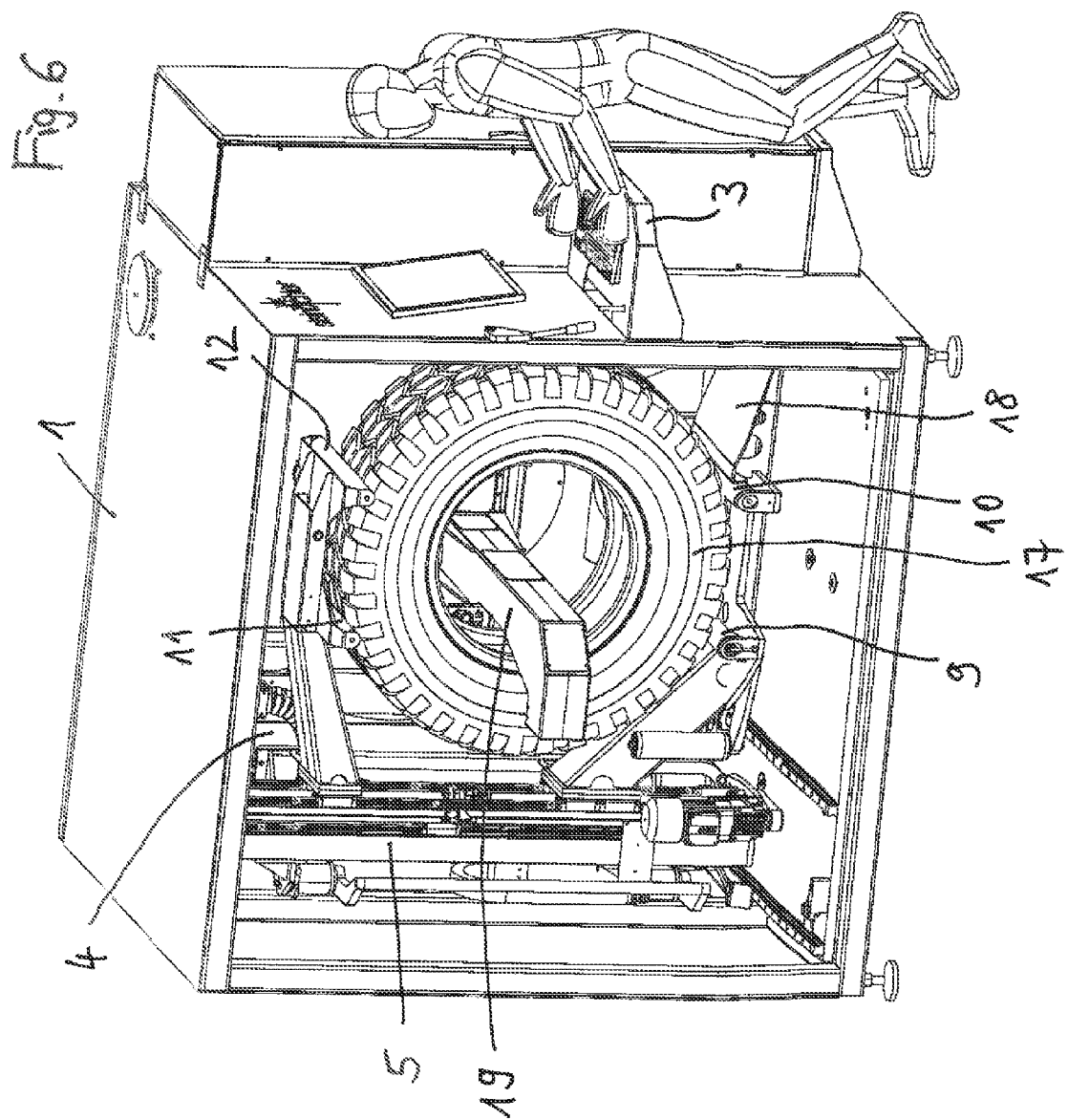
FIG. 6 shows the tire testing apparatus of FIGS. 1 to 5 in a condition corresponding to FIG. 5 from a different perspective, wherein the door has been omitted for reasons of a better graphical representation.

The measuring head carrier 19 is pivotable about its longitudinal axis I. FIG. 6 shows the measuring head carrier 19 in its starting position. In this position, the inner tread 21 and the outer side walls 23, 25 of the tire 17 are tested. The field of vision of the measuring heads 20, 22, 24 covers slightly more than one sixth of the associated tire surfaces.

Thereafter, the measuring head carrier 19 is pivoted by 60° about its longitudinal axis I in an anticlockwise direction, so that the position shown in FIG. 7 is reached. In this position, the next measurement is carried out. The process is repeated. The last, sixth measurement is carried out when the measuring head carrier 19 has been pivoted by 300° with respect to its starting position in anticlockwise direction about its longitudinal axis I.

Thereafter, the measuring head carrier 19 is shifted to the inside in radial direction. The holding frame 4 is pushed out of the housing 1 with the tire 17, the holders 13, 14 are moved away from each other in vertical direction, and the tire 17 is rolled away. This process is repeated in reverse order with the next tire 17 to be tested. This tire 17 is rolled over the ramp 18 onto the lower rollers 9, 10. The holders 13, 14 are moved towards each other in vertical direction, until they form a holder for the tires 17. The holding frame 4 with the tire 17 is pushed into the housing 1, wherein the measuring head carrier 19 penetrates through the opening 26 of the tire 17. Thereafter, the measuring head carrier 19 is shifted to the outside in radial direction r, until a position corresponding to FIG. 9 is reached. The measuring head carrier 19 still is in a position which is pivoted by 300° in anticlockwise direction with respect to the starting position as shown in FIG. 6. In this position, testing of the next tire 17 is started.

After the first picture of the surfaces of the tire 17 has been taken, the measuring head carrier 19 is pivoted about its longitudinal axis by 60° in the opposite direction, i.e. in clockwise direction. This process is repeated, until at the end of testing the next tire 17 the measuring head carrier 19 again takes the starting position when testing the first tire 17, which is shown in FIG. 6.

FIG. 10 shows a modification of the measuring head carrier 19 of FIG. 9, in which corresponding components are provided with the same reference numerals and are not described again. In the embodiment of FIG. 10, the measuring head carrier 19 comprises a first measuring head 20 for testing the inner tread 21 of the tire 17 and a second measuring head 22 for testing the outer side wall 23 of the tire 17. A third measuring head for testing the other outer side wall of the tire, however, is not present.

Figure 11A:
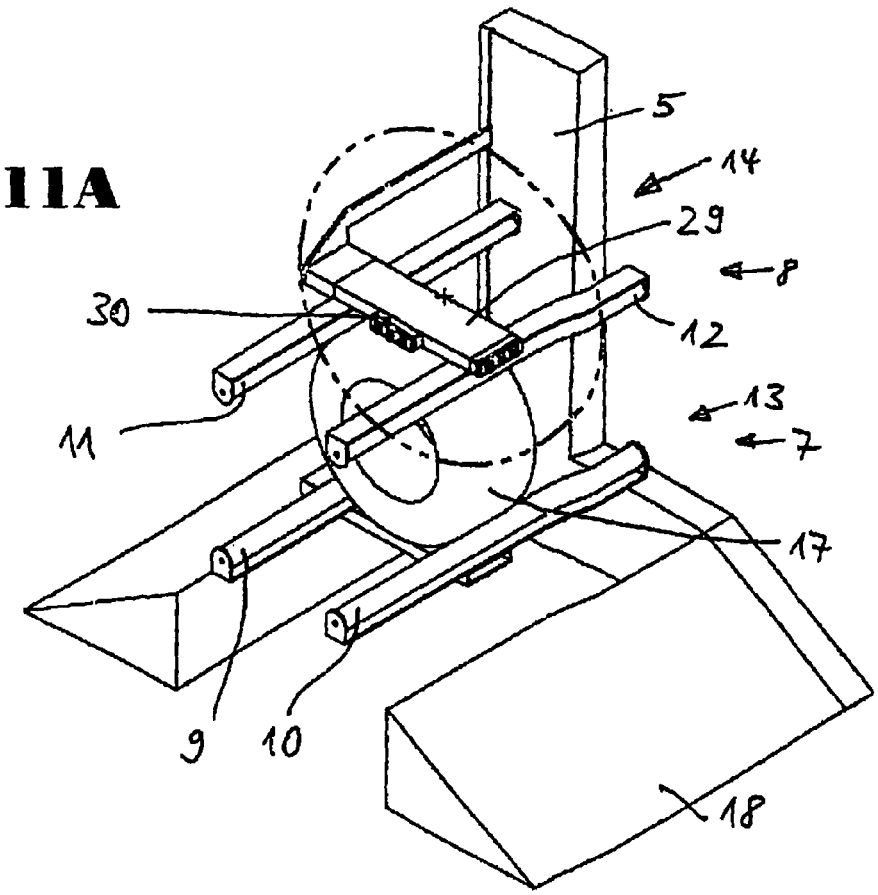
Figure 11B:
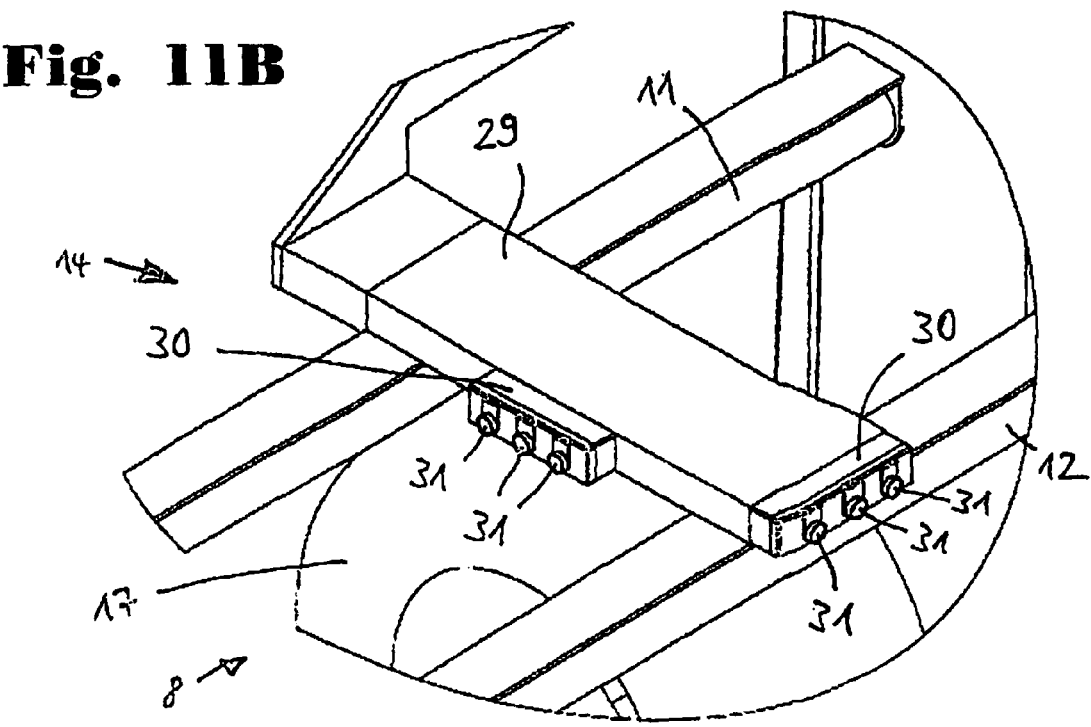

FIG. 11 shows a part of the tire testing apparatus in a perspective view. On a crossbeam 29 of the upper holder 14 a control means 30 is arranged. The control unit 30 comprises control knobs 31. The control means 30 serves to shift the holders 13, 14 in vertical direction and to center the tire 17. The control unit 30 furthermore can serve to put the tire into a rotary movement. It is, however, also possible to provide the control means 30 at another point, for example at the vertical column 5, at the holding frame 4 and/or at the housing 1.

FIG. 12 shows a pallet 27 for holding a tire 17. The pallet 27 comprises ramps 18 as well as lower rollers 9, 10 and upper rollers 11, 12 which are movable relative to the lower rollers 9, 10 and which together with the lower rollers 9, 10 form a holder for the tire 17. The upper rollers 11, 12 are mounted in an upper holder 14, which is shiftable along a vertical shifting axis 16. On the bottom surface of the pallet 18 engagement gaps 28 for the prongs of a fork lift truck are provided. The pallet 27 is connectable with the tire testing apparatus.

Figure 13A:
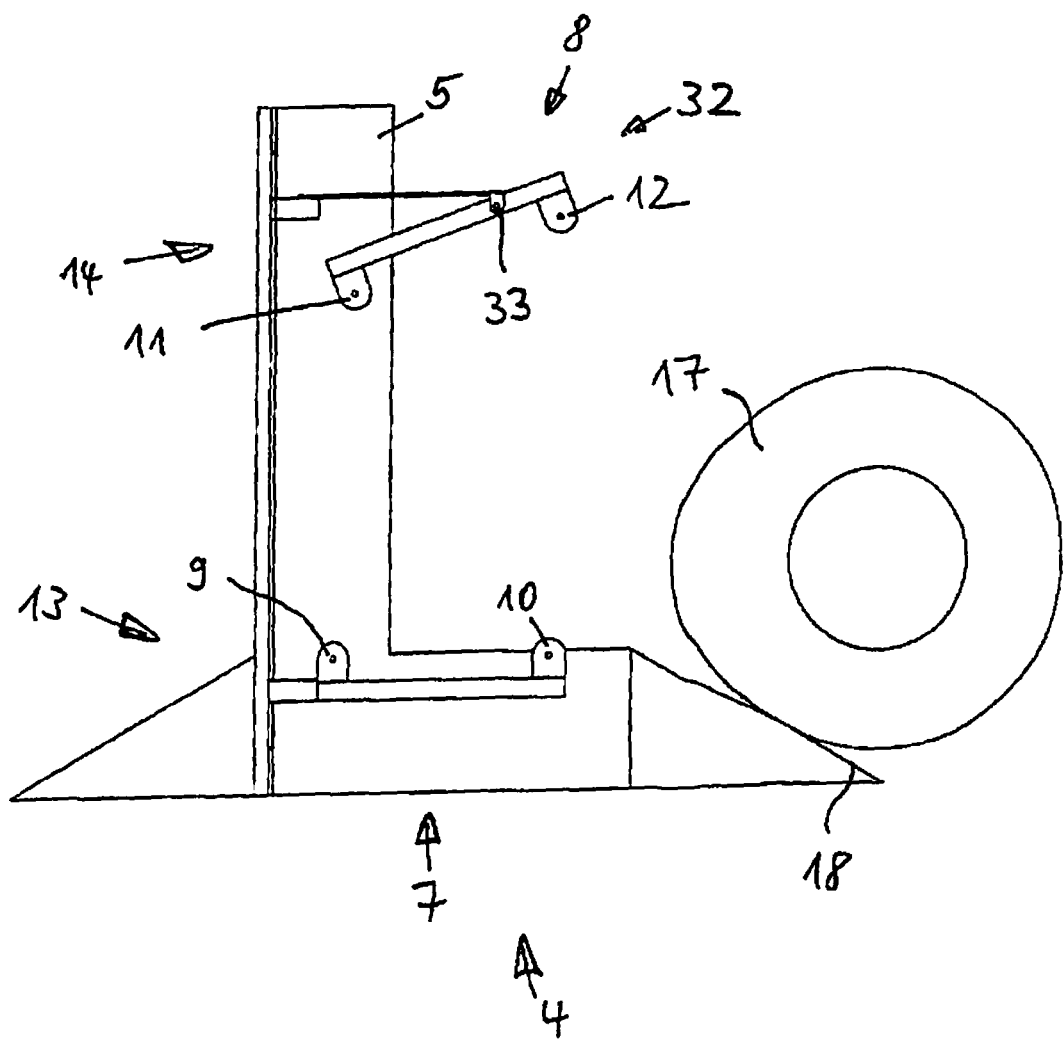
Figure 13B:
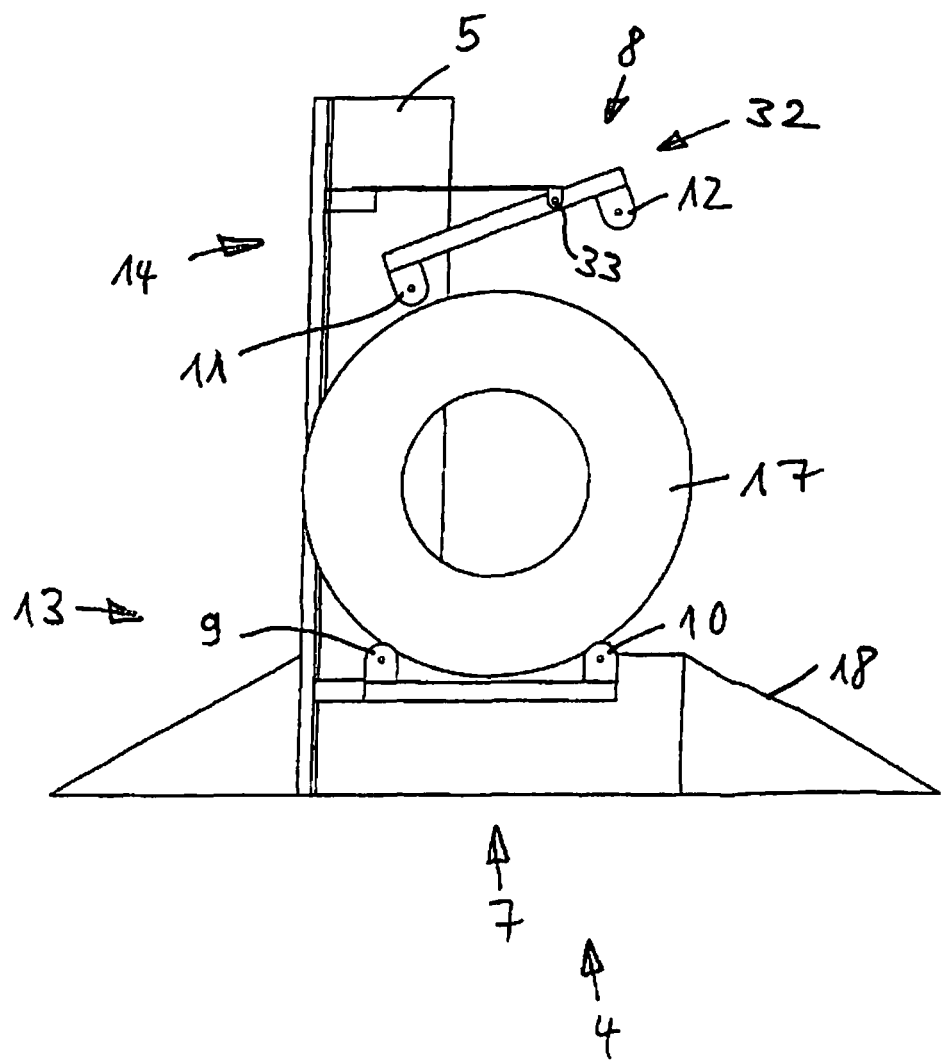
Figure 13C:
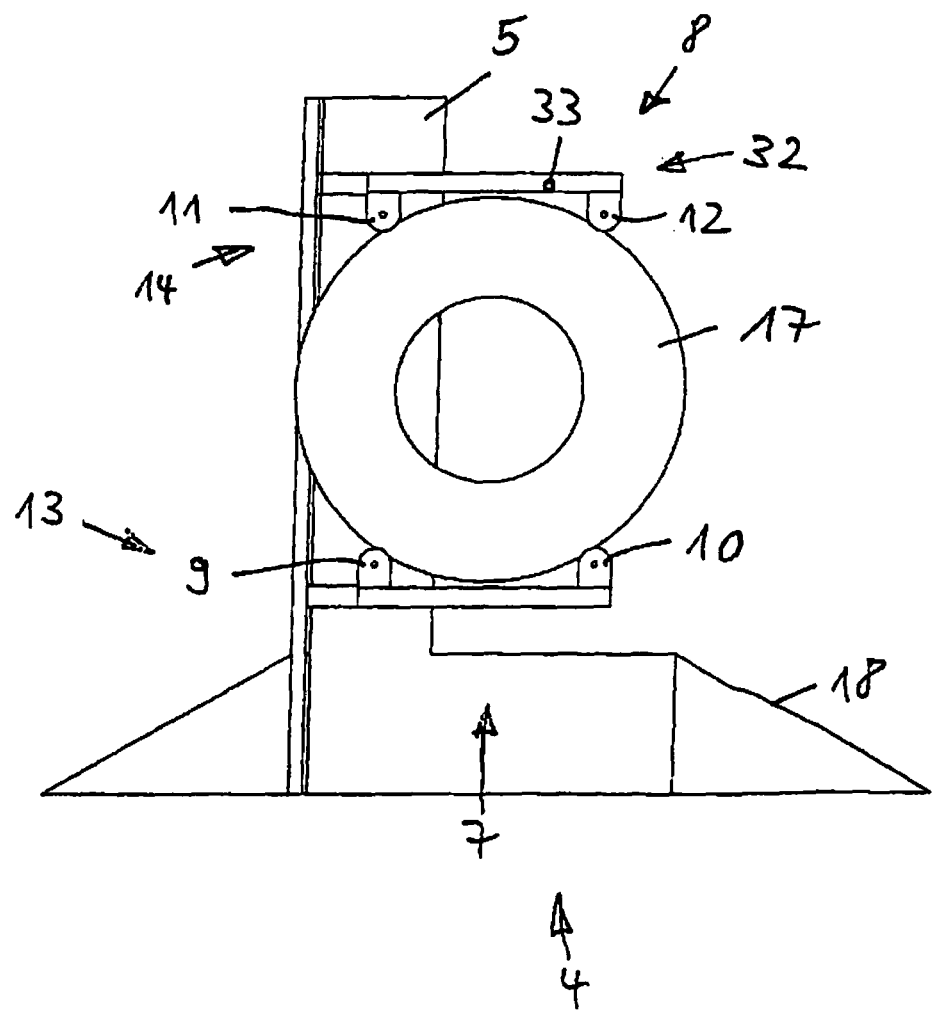

FIG. 13 shows a part of the tire testing apparatus with a modification of the upper holder 14, in which corresponding parts are provided with the same reference numerals and are not described again. In the embodiment of FIG. 13, the upper holder 14 comprises a pivotally mounted rocker 32. The rocker 32 is mounted eccentrically. The pivot axis 33 of the rocker 32 is located outside the center of gravity of the rocker 32. It is located closer to the roller 12 than to the roller 11. The rocker 32 thereby is inclined in its starting position, namely such that the roller 11 is located at a lower level than the roller 12. When the upper holder is moved downwards, the roller 11 located at a lower level initially gets in contact with the tread of the tire 17. By a further relative movement of the rocker 32 in downward direction, the rocker 32 is pivoted, until the second roller 12, initially located at a higher level, also rests against the upper tread of the tire, as shown in FIG. 13c. The rocker 32 then is in a horizontal position. At the upper holder 14 a sensor is provided, which recognizes this horizontal position and sends a sensor signal to a switch by which the further relative movement of the holders 13, 14 is terminated.

FIG. 14 shows a modified embodiment of the tire testing apparatus with two measuring head carriers 19, 19.1 of the type shown in FIG. 9, wherein corresponding components are provided with the same reference numerals and are not described again. The measuring head carriers 19 and 19.1 are offset by 180°.

FIGS. 15 and 16 show a modification of the tire testing apparatus with four measuring head carriers 19, 19.1, 19.2, 19.3 of the type shown in FIG. 9, wherein corresponding components are provided with the same reference numerals and are not described again. The measuring head carriers 19, 19.1, 19.2, 19.3 here are each offset with respect to each other by 90°.

Figure 17:
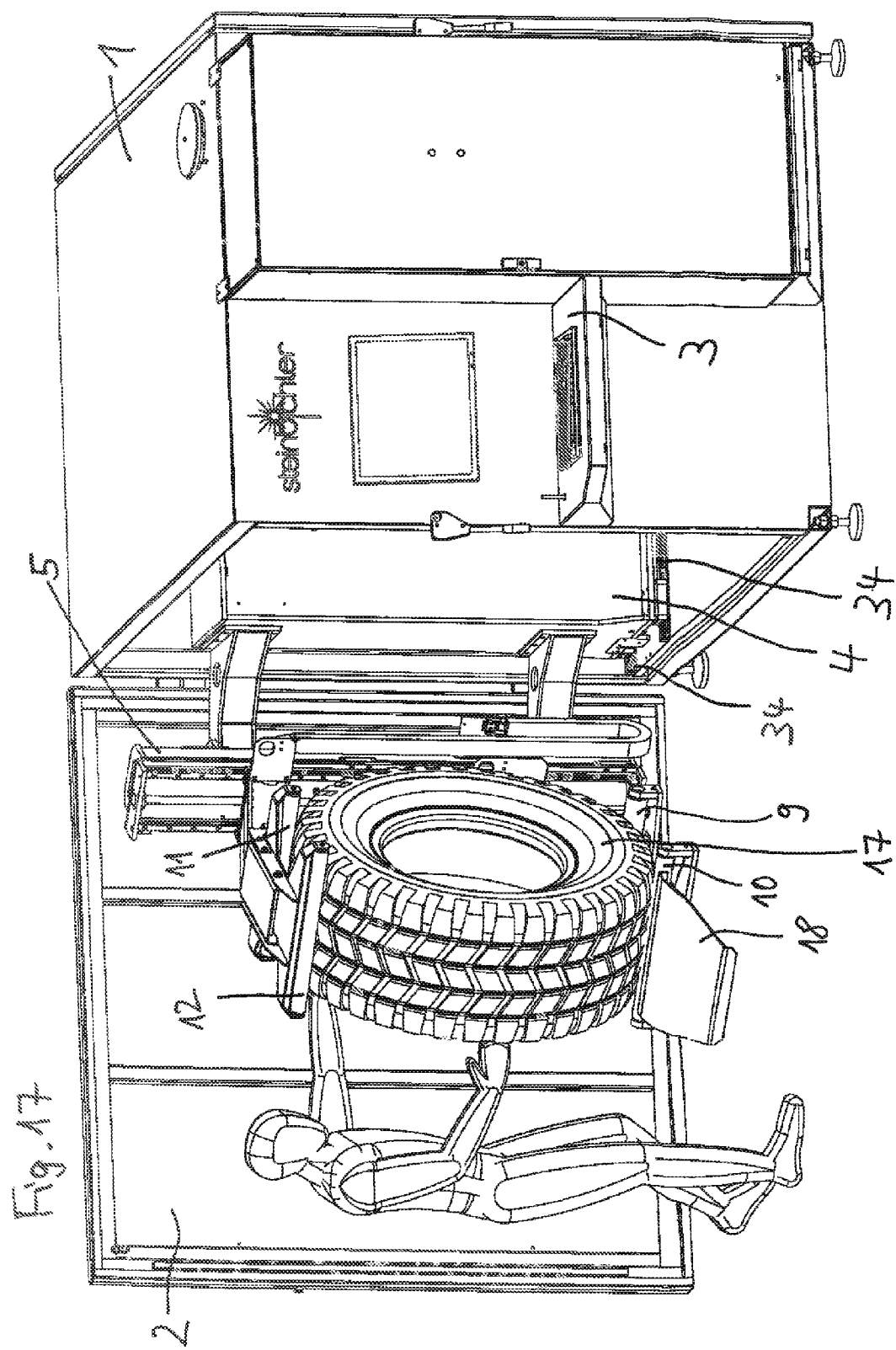
FIG. 17 shows a modification of the tire testing apparatus with a column which is pivotally mounted on a holding frame, wherein the tire is located at a middle height.
Figure 18:
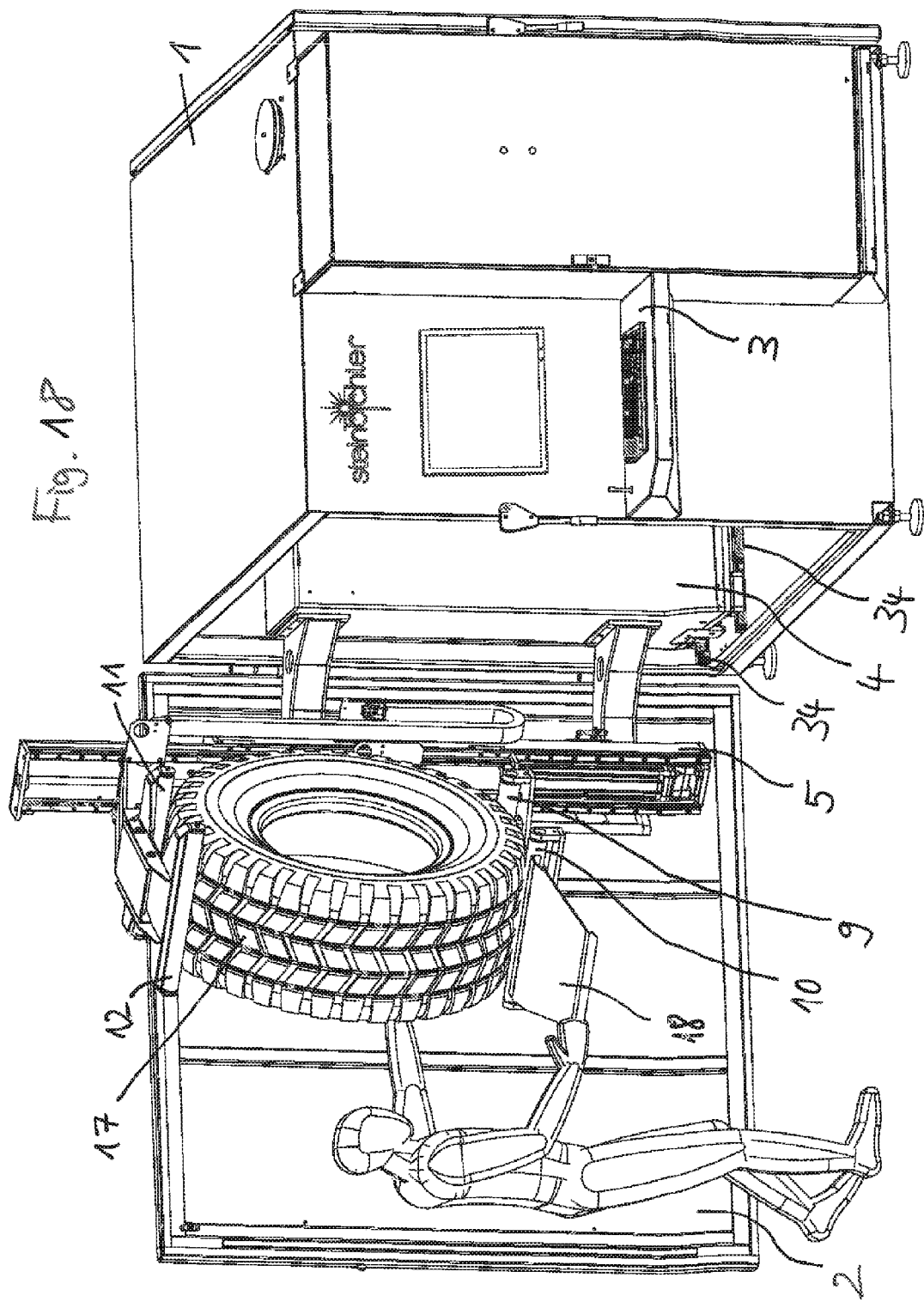
FIG. 18 shows the tire testing apparatus of FIG. 17 with an elevated position of the tire.

FIGS. 17 and 18 show a modification of the tire testing apparatus, in which the column 5 is pivotally mounted on the holding frame 4. The pivot axis of the column 5 extends vertically. As can be taken from FIGS. 17 and 18, the holding frame 4 is longitudinally shiftably guided on horizontally extending rails 34. The rails 34 extend from the opening of the housing 1 to the inside. When the holding frame 4 is extended, i.e. when it is located in the region of the opening in the housing 1, the column 5 protrudes from the housing 1. In this position, the column 5 can be pivoted to the outside, as shown in FIG. 17. In this position, loading and unloading with a tire 17 is easily possible. After loading with a tire 17, the column 5 is pivoted to the inside from the position shown in FIG. 17, so that the axis of rotation of the tire 17 and the axes of rotation of the rollers 9, 10, 11, 12 extend parallel to the rails 34 and the longitudinal extension of the measuring head carrier 19. In this position, the holding frame 4 with the column 5 and the tire 17 is moved into the housing 1.

In the modification as shown in FIGS. 17 and 18, the upper bearing elements 8 and with the same the upper rollers 11, 12 as well as the lower bearing elements 7 and with the same the lower rollers 9, 10 are adjustable in the same direction. In FIG. 17, the bearing elements 7, 8 and the rollers 9, 10, 11, 12 form a holder for the tires 17. The bearing elements 7, 8 and the rollers 9, 10, 11, 12 can be moved upwards in the same direction, until the position shown in FIG. 18 is reached. In this position, in particular a further measuring and/or testing method can be carried out. It is advantageous that the column 5 with the tire 17 is swung out. As a result, the tire 17 is easily accessible on both sides for carrying out the measuring and/or testing method. This measuring and/or testing method can be controlled and/or monitored by the operator.

The invention claimed is:

1. A tire testing apparatus for testing a tire, comprising:
   loading means for the tire (17);
   one or more measuring heads (20, 22, 24) which is movable relative to the tire (17), the one or more measuring heads (20, 22, 24) are arranged on one or more horizontally extending measuring head carriers (19), the one or more measuring head carriers (19) extend through a hole defined by the tire (17) and the one or more measuring head carriers (19) is oriented parallel to the rotational axis of the tire, wherein at least one measuring head is arranged to test an inner tread (21) of the tire (17); and
   lower bearing elements (7) that rest against a first end of the tire (17), on which the tire (17) can be positioned in a vertical position, and upper bearing elements (8) that rest against a second end of the tire (17) opposite the first end and on an outside portion of the tire (17), the upper bearing elements (8) being movable relative to the lower bearing elements (7) and which together with the lower bearing elements (7) form a holder for the tire (17).

2. The tire testing apparatus according to claim 1, wherein the bearing elements (7; 8) are formed as rollers (9, 10; 11, 12).

3. The tire testing apparatus according to claim 1, wherein the upper bearing elements (8) are arranged on a pivotally mounted rocker, wherein a pivot axis of the pivotally mounted rocker is outside a center of gravity of the pivotally mounted rocker.

4. The tire testing apparatus according to claim 1, wherein the upper bearing elements (8) and the lower bearing elements (7) are adjustable in opposite directions.

5. The tire testing apparatus according to claim 1, wherein the upper bearing elements (8) and the lower bearing elements (7) are adjustable in the same direction.

6. The tire testing apparatus according to claim 1, wherein a holder (14) for the upper bearing elements (8) includes a control means for the upper and lower bearing elements (7, 8) is arranged.

7. The tire testing apparatus according claim 1, wherein the bearing elements (7, 8) are arranged on a movable holding frame (4).

8. The tire testing apparatus according to claim 7, wherein the lower and upper bearing elements (7, 8) are arranged on a column (5) which is pivotally mounted on the movable holding frame (4), wherein a pivot axis of the column (5) extends vertically such that column (5) pivots the lower and upper bearing elements (7, 8) in a horizontal direction.

9. The tire testing apparatus according to claim 1. wherein one bearing element of the lower bearing elements (7) is formed as drivable roller (9).

10. The tire testing apparatus according to claim 1, wherein the one or more measuring heads (20, 22, 24) are arranged on one or more horizontally extending measuring head carriers (19), wherein the one or more measuring head carriers (19) extends through a hole defined by the tire (17), such that a first measuring head (22) is positioned on a first side of the tire (17), a second measuring head (24) is positioned on a second side of the tire (17), and a third measuring head (20) is positioned in between the first measuring head (22) and the second measuring head (24).

11. The tire testing apparatus according to claim 10, wherein on the one or more measuring head carriers (19) the first measuring head (22) of the one or more measuring heads (20, 22, 24) is arranged for testing a first outer side wall (23) of the tire (17).

12. The tire testing apparatus according to claim 11, wherein on the one or more measuring head carriers (19) the second measuring head (24) of the one or more measuring heads (20, 22, 24) is arranged for testing a second outer side wall (25) of the tire (17), the second outer side wall (25) being opposite the first outer side wall (23).

13. The tire testing apparatus according to claim 10, wherein the one or more measuring head carriers (19) are adjustable in radial direction (r) within the hole defined by the tire (17).

14. The tire testing apparatus according to claim 1, wherein one or more measuring heads (20, 22, 24) include recording optics with variable focal length.

15. The tire testing apparatus according to claims 10 to 14, wherein the one or more measuring head carriers (19) are pivotable about their longitudinal axes (11).

16. The tire testing apparatus according to claim 1, further comprising a pallet (27) with pallet lower bearing elements on which the tire (17) can be positioned in a vertical position, and with pallet upper bearing elements which are movable relative to the pallet lower bearing elements and which together with the pallet lower bearing elements form a pallet holder for the tire (17), wherein the pallet (27) is connectable with the tire testing apparatus.

17. The tire testing apparatus of claim 15, wherein when testing the tire (17), the one or more measuring head carriers (19) are pivoted in one direction about its or their longitudinal axes (11) and when testing a next tire, the one or more measuring head carriers (19) are pivoted in the opposite direction.

18. The tire testing apparatus of claim 7, wherein the movable holding frame (4) is completely enclosed within a housing (1) of the tire testing apparatus, and an image of a first measuring head (20) of the one or a measuring heads (20, 22, 24) is taken for testing an inner tread (21) of the tire (17), and that a movement of the movable holding frame (4) is terminated when the first measuring head (20) is positioned opposite the inner tread (21) of the tire (17).

19. The tire testing apparatus of claim 18, wherein the image of the first measuring head (20) for testing the inner tread (21) of the tire (17) is transmitted to a screen.

* * * * *